(12) United States Patent  
Shimura et al.

(10) Patent No.: US 10,437,108 B2
(45) Date of Patent: Oct. 8, 2019

(54) METHOD FOR MANUFACTURING LIQUID CRYSTAL DISPLAY DEVICE AND LIQUID CRYSTAL DISPLAY DEVICE

(71) Applicant: Japan Display Inc., Tokyo (JP)

(72) Inventors: Masato Shimura, Tokyo (JP); Tomoya Sugano, Tokyo (JP); Masato Ai, Tokyo (JP); Tomonori Nishino, Tokyo (JP); Satoshi Hashimoto, Tokyo (JP); Hideki Shiina, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/710,208

(22) Filed: Sep. 20, 2017

(65) Prior Publication Data

US 2018/0011354 A1 Jan. 11, 2018

Related U.S. Application Data

(62) Division of application No. 14/751,806, filed on Jun. 26, 2015, now abandoned.

(30) Foreign Application Priority Data

Jun. 26, 2014 (JP) .................................. 2014-131941

(51) Int. Cl.
G02F 1/1339 (2006.01)
G02F 1/1337 (2006.01)

(52) U.S. Cl.
CPC .......... *G02F 1/1339* (2013.01); *G02F 1/1337* (2013.01)

(58) Field of Classification Search
CPC .................................................... G02F 1/1339
See application file for complete search history.

(56) References Cited

U.S. PATENT DOCUMENTS 6,646,709 B2 * 11/2003 Matsumoto ........... G02F 1/1339
349/153
7,630,050 B2 12/2009 Kobayashi et al.
(Continued)

FOREIGN PATENT DOCUMENTS

CN 101017289 A 8/2007
CN 102792217 A 11/2012
(Continued)

OTHER PUBLICATIONS

Japanese Office Action dated Feb. 27, 2018 for the corresponding Japanese Patent Application No. 2014-131941.
(Continued)

*Primary Examiner* — Edmond C Lau
(74) *Attorney, Agent, or Firm* — Michael Best & Friedrich LLP

(57) ABSTRACT

To improve the reliability of a liquid crystal display device, a liquid crystal display device includes a first substrate a second substrate opposing the first substrate, a liquid crystal layer arranged between the first and second substrates, and a sealing section arranged around the liquid crystal layer. The sealing section includes a member arranged around the liquid crystal layer and extending along an outer edge of the liquid crystal layer in a plan view and a sealing material arranged on both adjacent sides of the member and continuously surrounding a periphery of the liquid crystal layer in a plan view. Further, the first substrate has an oriented film formed on a back surface and a part of the sealing material overlaps a peripheral edge of the oriented film in a thickness direction on a side of the liquid crystal layer of the member.

9 Claims, 19 Drawing Sheets

(56) References Cited

U.S. PATENT DOCUMENTS

| | | |
|---|---|---|
| 7,646,458 B2 | 1/2010 | Onda |
| 9,128,330 B2 | 9/2015 | Ishikawa et al. |
| 2007/0182912 A1* | 8/2007 | Kobayashi ............ G02F 1/1339 349/153 |
| 2012/0194494 A1* | 8/2012 | Jung ................ G02F 1/133723 345/208 |
| 2013/0010240 A1 | 1/2013 | Moriwaki |
| 2014/0092357 A1 | 4/2014 | Chen et al. |
| 2015/0301370 A1 | 10/2015 | Moriwaki |

FOREIGN PATENT DOCUMENTS

| | | |
|---|---|---|
| CN | 103576392 A | 2/2014 |
| JP | 2000-137234 A | 5/2000 |
| JP | 2007-114586 A | 5/2007 |
| JP | 2007-212667 A | 8/2007 |
| JP | 2014-032315 A | 2/2014 |
| WO | 2011/132374 A1 | 10/2011 |

OTHER PUBLICATIONS

Chinese Office Action dated Nov. 27, 2017 for corresponding Chinese Patent Application No. 201510364524.3.

* cited by examiner

METHOD FOR MANUFACTURING LIQUID CRYSTAL DISPLAY DEVICE AND LIQUID CRYSTAL DISPLAY DEVICE

CROSS-REFERENCE TO RELATED APPLICATIONS

This application is a divisional application of U.S. patent application Ser. No. 14/751,806, filed on Jun. 26, 2015. Further, this application claims priority from Japanese Patent Application No. 2014-131941 filed on Jun. 26, 2014, the entire content of which are hereby incorporated by reference into this application.

TECHNICAL FIELD OF THE INVENTION

The present invention relates to a display device, for example, a technique effectively applied to a liquid crystal display device in which a pair of substrates is arranged to oppose each other and a liquid crystal layer is formed between the opposing substrates.

BACKGROUND OF THE INVENTION

A display device, in which a display functional layer such as a liquid crystal layer is arranged between a pair of substrates arranged to oppose each other, to seal a periphery of the display functional layer, has been known.

Japanese Patent Application Laid-Open No. 2000-137234 (Patent Document 1) describes a technique for forming a seal position control pattern and a seal waving control pattern around a substrate to enhance position accuracy of an applied sealing material and reduce waving at an edge of a sealed sealing material, as a method for manufacturing a liquid crystal display device.

SUMMARY OF THE INVENTION

A liquid crystal display device has a configuration in which a liquid crystal layer serving as a display functional layer is formed between a pair of substrates, and the pair of substrates is adhesively fixed with a sealing material in a sealing section surrounding a periphery of the liquid crystal layer, so that the liquid crystal layer is protected.

Members constituting the liquid crystal display device include a material having a high fluidity. A material used as an oriented film for aligning an orientation of a liquid crystal may include a resin material having a high fluidity such as polyimide resin upon forming a film. Therefore, if the oriented film is formed in a display region on a pair of substrates in the liquid crystal display device, the oriented film may easily spread to the periphery of the display region.

If a wide space is ensured around the display region, the oriented film and a sealing material may be prevented from overlapping each other by significantly increasing a separation distance between the display region and the sealing section. However, an attempt to reduce the area of a so-called frame section or a frame region serving as a non-display section surrounding a periphery of the display region causes the following problems.

More specifically, if the area of the frame section is reduced, the separation distance between the display region and the sealing section needs to be decreased. Therefore, when the oriented film too spreads, the oriented film remains sandwiched between the substrate and the sealing material, causing a sealing property of the sealing section to deteriorate. Thus, the pair of substrates is adhesively fixed in an insufficient manner.

A member for damping the oriented film may be provided in the frame region so as to suppress spreading of the oriented film. To reduce the area of the frame region, however, the damping member needs to be provided in the sealing section. That is, there is a region where the sealing material and the oriented film partially overlap each other. In a process for sealing the pair of substrates among processes for manufacturing the liquid crystal display device, the sealing material is applied to the sealing section, and the opposing substrates are brought closer to each other, thereby pushing out and sealing the sealing material. However, the damping member arranged in the sealing section may cause spreading of the sealing section to be inhibited.

The present invention is directed to providing a technique for improving the reliability of a display device.

A liquid crystal display device according to an aspect of the present invention includes a first substrate having a first surface, a second substrate having a second surface opposing the first surface of the first substrate, a liquid crystal layer arranged between the first substrate and the second substrate, and a sealing section arranged around the liquid crystal layer and provided between the first substrate and the second substrate. The sealing section includes a first member arranged around the liquid crystal layer and extending along an outer edge of the liquid crystal layer in a plan view, and a sealing material arranged on both adjacent sides of the first member and continuously surrounding a periphery of the liquid crystal layer in a plan view. Further, the first substrate has an oriented film formed on the first surface serving as an interface contacting the liquid crystal layer, and a part of the sealing material overlaps a peripheral edge of the oriented film in a thickness direction on a side of the liquid crystal layer of the first member.

As another aspect of the present invention, the sealing material has a first portion arranged on a side of the liquid crystal layer of the first member and a second portion arranged on an opposite side of the liquid crystal layer of the first member, and a width of the second portion is 25% or more of a width of the entire sealing section.

As another aspect of the present invention, a width of the first portion is 25% or more of a width of the entire sealing section.

As another aspect of the present invention, the first member contacts the first substrate, and the sealing material exists between the first member and the second substrate.

As another aspect of the present invention, the sealing section further has a second member arranged between the first member and the liquid crystal layer and extending along the first member, and the sealing material is arranged on both adjacent sides of the first member and on both adjacent sides of the second member.

As another aspect of the present invention, the first member and the second member are arranged on opposite sides to each other with a center line in a width direction of the sealing section sandwiched therebetween.

As another aspect of the present invention, the sealing material has a first portion arranged on a side of the liquid crystal layer of the second member and a second portion arranged on an opposite side of the liquid crystal layer of the first member, and a width of the second portion is 25% or more of a width of the entire sealing section.

As another aspect of the present invention, a width of the first portion arranged on a side of the liquid crystal layer of the second member is 25% or more of a width of the entire sealing section.

As another aspect of the present invention, the first member and the second member contact the first substrate, and the sealing material exists between the first member and the second substrate and between the second member and the second substrate.

A method for manufacturing a liquid crystal display device according to an aspect of the present invention includes (a) a step of forming a first member extending along an outer edge of a display region in a sealing section surrounding a periphery of the display region, and then forming an oriented film on a side of the display region of the first member, on a first surface of a first substrate. The method for manufacturing a liquid crystal display device also includes (b) a step of applying a sealing material to the sealing section after the step (a). The method for manufacturing a liquid crystal display device also includes (c) a step of making a second substrate having a second surface opposing the first surface and the first substrate overlap each other via the sealing material after the step (b). The method for manufacturing a liquid crystal display device also includes (d) a step of curing the sealing material to adhesively fix the first substrate and the second substrate. Further, the step (a) includes a step of damping spreading of the oriented film by the first member, and in the step (b), the sealing material is applied so as to stride over the first member in a width direction of the first member.

As another aspect of the present invention, in the step (b), the sealing material is discharged while a center of an opening of a nozzle for applying the sealing material is positioned above the first member.

As another aspect of the present invention, in the step (c), the first member and the second member do not contact each other.

A method for manufacturing a liquid crystal display device according to another aspect of the present invention includes (a) a step of forming a first member extending along an outer edge of a display region and a second member extending along the first member between the first member and the display region in a sealing section surrounding a periphery of the display region, and then forming an oriented film on a side of the display region of the second member, on a first surface of a first substrate. The method for manufacturing a liquid crystal display device also includes (b) a step of applying a sealing material to the sealing section after the step (a). The method for manufacturing a liquid crystal display device also includes (c) a step of making a second substrate having a second surface opposing the first surface and the first substrate overlap each other via the sealing material after the step (b). The method for manufacturing a liquid crystal display device also includes (d) a step of curing the sealing material to adhesively fix the first substrate and the second substrate. Further, the step (a) includes a step of damping spreading of the oriented film by the second member, and in the step (b), the sealing material is applied so as to stride over the first member and the second member in a width direction of the first member and the second member.

As another aspect of the present invention, the first member and the second member are formed on opposite sides to each other with a center line in a width direction of the sealing section sandwiched therebetween.

As another aspect of the present invention, in the step (b), the sealing material is discharged while a center of an opening of a nozzle for applying the sealing material is positioned above a region between the first member and the second member.

BRIEF DESCRIPTIONS OF THE DRAWINGS

DESCRIPTIONS OF THE PREFERRED EMBODIMENTS

Figure 1:
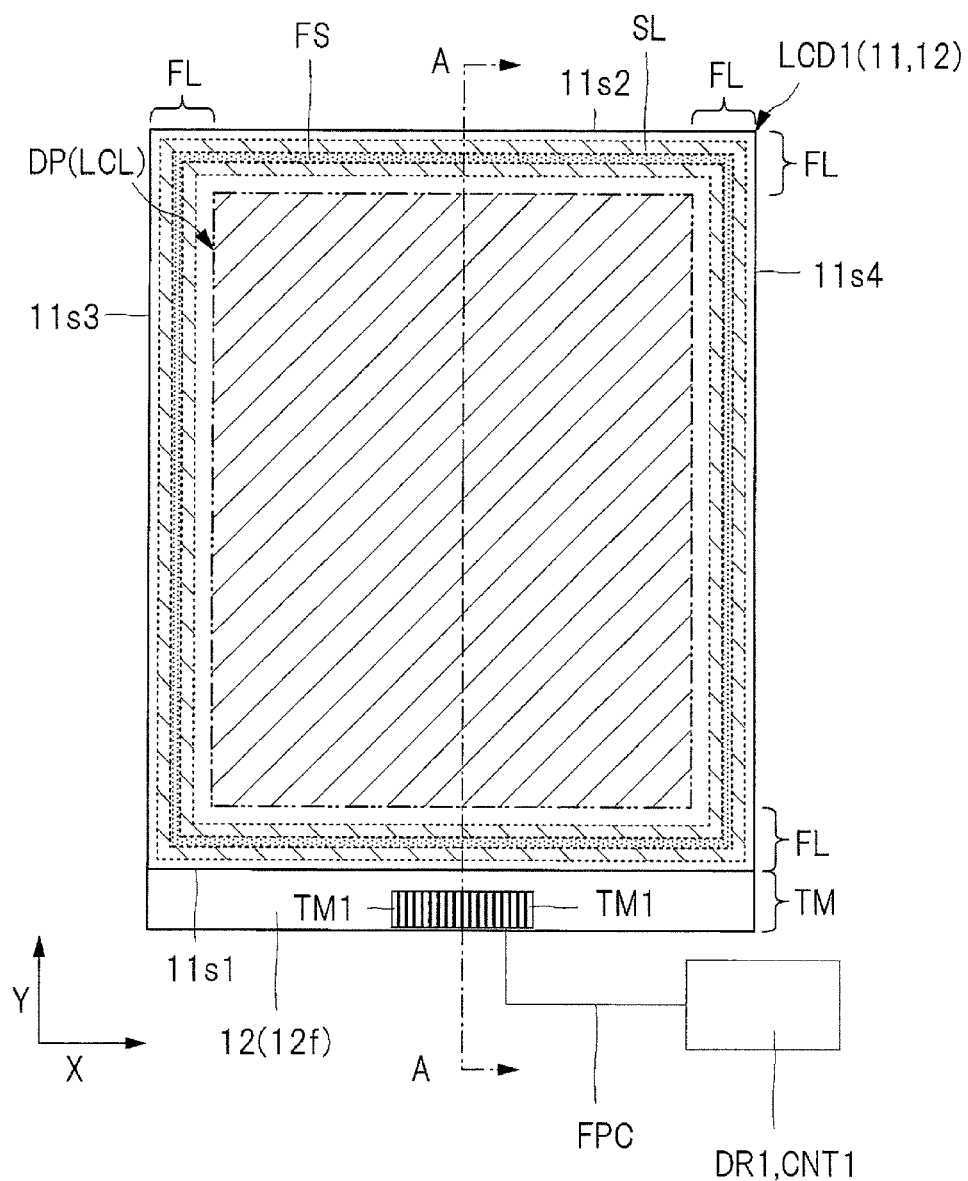
FIG. 1 is a plan view illustrating an example of a liquid crystal display device according to an embodiment.

Hereinafter, embodiments of the present invention will be described with reference to drawings. Note that the disclosures are provided by way of example, and any suitable variations easily conceived by a person with ordinary skill in the art while pertaining to the gist of the invention are of course included in the scope of the present invention. Further, the drawings, widths, thicknesses and shapes of respective components may be schematically illustrated in comparison with the embodiments for the purpose of making the description more clearly understood, but these are merely examples, and do not limit the interpretations of the present invention. Further, in the specification and drawings, elements which are similar to those already mentioned with respect to previous drawings are denoted by the same reference characters, and detailed descriptions thereof will be suitably omitted.

The liquid crystal display device is broadly classified into two categories, described below, depending on an application direction in which an electric field for changing an orientation of liquid crystal molecules in the liquid crystal layer serving as the display functional layer. More specifically, the first category is a so-called vertical electric field mode in which an electric field is applied in a thickness direction (or an out-of-plane direction) of the liquid crystal display device. Examples of the vertical electric field mode include a Twisted Nematic (TN) mode and a Vertical Alignment (VA) mode. The second category is a so-called horizontal electric field mode in which an electric field is applied in a planar direction (or an in-plane direction) of the liquid crystal display device. Examples of the horizontal electric field mode include an In-Plane Switching (IPS) mode and a Fringe Field Switching (FFS) mode serving as one type of the IPS mode. While a technique described below is applicable to both the vertical electric field mode and the horizontal electric field mode. However, a display device in the horizontal electric field mode will be described as an example in the present embodiment.

<Basic Configuration of Liquid Crystal Display Device>

Figure 2:
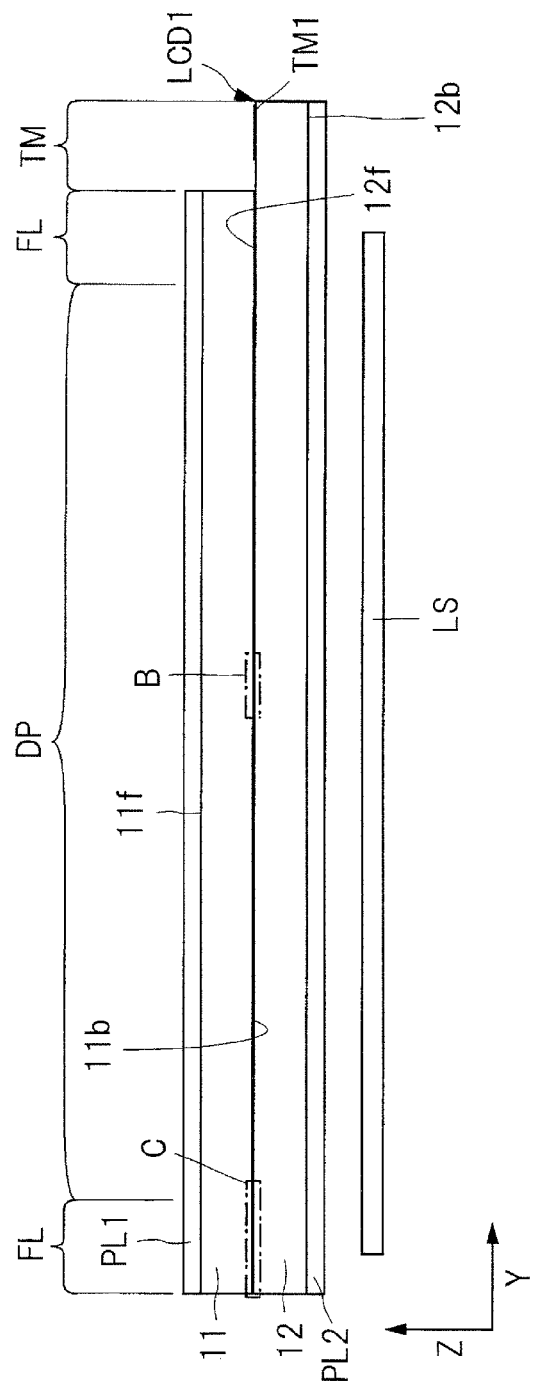
FIG. 2 is a sectional view taken along a line A-A illustrated in FIG. 1.
Figure 3:
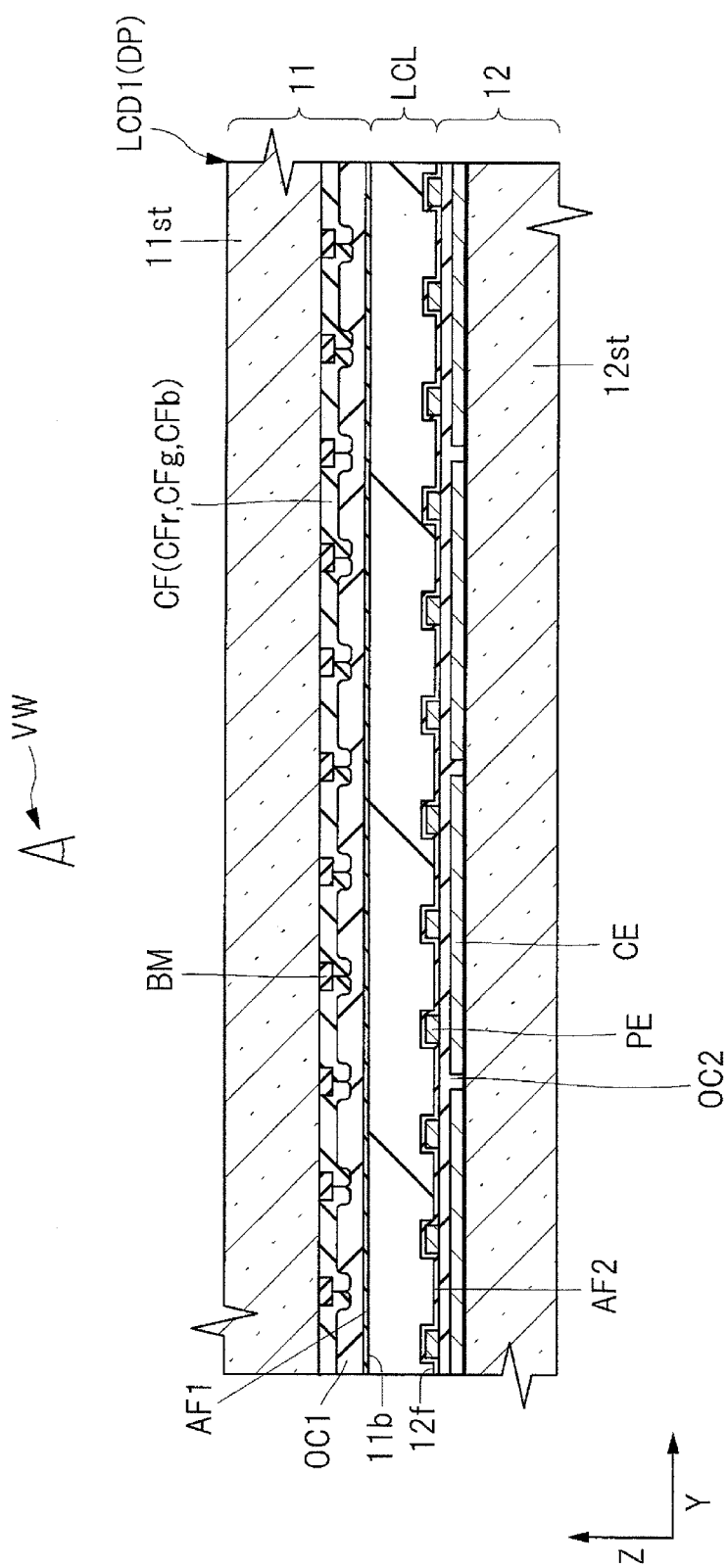
FIG. 3 is an enlarged sectional view of a portion B illustrated in FIG. 2.
Figure 4:
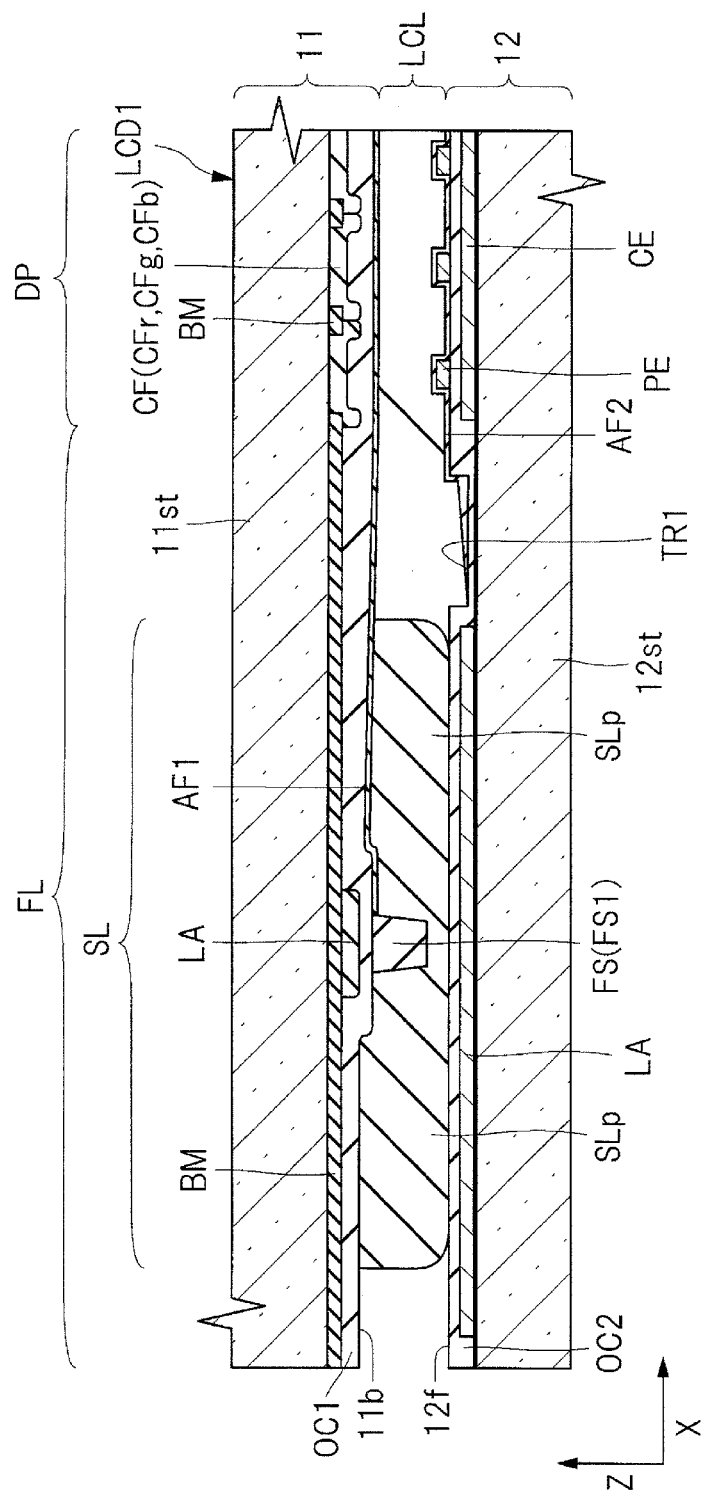
FIG. 4 is an enlarged sectional view of a portion C illustrated in FIG. 2.

A basic configuration of a liquid crystal display device will be first described. FIG. 1 is a plan view illustrating an example of a liquid crystal display device according to the present embodiment, and FIG. 2 is a sectional view taken along a line A-A illustrated in FIG. 1. FIG. 3 is an enlarged sectional view of a portion B illustrated in FIG. 2. FIG. 4 is an enlarged sectional view of a portion C illustrated in FIG. 2.

While FIG. 1 is a plan view, a display section DP is hatched, and a contour of the display section DP is indicated by a two-dot and dash line to make a boundary between the display section DP and a frame section FL easy to see in a plan view. In FIG. 1, a sealing section SLP is hatched, and a contour of the sealing section SL is indicated by a dotted line to make a planar shape of the sealing section SL provided to surround a periphery of the display section DP easy to see. In FIG. 1, to explicitly indicate a layout in a plan view of a member FS illustrated in FIG. 4, a contour of the member FS is indicated by a dotted line and a dotted pattern. While FIG. 2 is a sectional view, the hatching is omitted for ease of viewing.

As illustrated in FIG. 1, a liquid crystal display device LCD1 according to the present embodiment includes the display section DP serving as a display region where an image, which can be viewed from outside in response to an input signal, is formed. The liquid crystal display device LCD1 includes the frame section FL serving as a non-display region provided in a frame shape around the display section DP in a plan view. The liquid crystal display device LCD1 further includes a terminal section TM provided outside the frame section FL, in a plan view. In the terminal section TM, a plurality of terminals TM1 for supplying an electric signal or a voltage for driving to a plurality of elements for display formed in the display section DP, are formed.

As schematically illustrated in FIG. 1, the plurality of terminals TM1 are connected to a wiring path FPC. The wiring path FPC is a so-called flexible wiring board in which a plurality of wirings are formed in a resin film and which can be freely deformed depending on a shape of an arrangement location. The plurality of terminals TM1 are electrically connected to a driving circuit DR1 or a control circuit CM1 for image display via the wiring path FPC.

The liquid crystal display device LCD1 has a configuration in which a liquid crystal layer is formed between a pair of substrates arranged to oppose each other. More specifically, as illustrated in FIG. 2, the liquid crystal display device LCD1 includes a substrate 11 on the side of the display surface, a substrate 12 positioned on the opposite side of the substrate 11, and a liquid crystal layer LCL (see FIG. 3) arranged between the substrate 11 and the substrate 12.

The liquid crystal display device LCD1 includes the sealing section SL formed in the frame section FL around the display section DP having the liquid crystal layer LCL formed therein in a plan view, as illustrated in FIG. 1. The sealing section SL is formed to continuously surround a periphery of the display section DP, and the substrate 11 and the substrate 12 illustrated in FIG. 2 are adhesively fixed to each other with a sealing material provided in the sealing section SL illustrated in FIGS. 1 and 4. Thus, the sealing section SL is provided around the display section DP, so that the liquid crystal layer LCL formed in the display section DP and a part of the frame section FL can be sealed.

The substrate 11 illustrated in FIG. 1 has a side $11s1$ extending in an X-direction, a side $11s2$ opposing the side $11s1$, a side $11s3$ extending in a Y-direction perpendicular to the X-direction, and a side $11s4$ opposing the side $11s3$ in a plan view. Respective distances from the sides $11s1$, $11s2$, $11s3$, and $11s4$ of the substrate 11 illustrated in FIG. 6 to the display section DP are substantially equal.

As illustrated in FIG. 2, a polarizing plate PL2, which polarizes light generated from the light source LS, is provided on the side of a back surface $12b$ of the substrate 12 in the liquid crystal display device LCD1. The polarizing plate PL2 is adhesively fixed to the substrate 12 via an adhesive layer. On the other hand, a polarizing plate PL1 is provided on the side of a front surface $11f$ of the substrate 11. The polarizing plate PL1 is adhesively fixed to the substrate 11 via an adhesive layer.

While basic components for forming a display image are illustrated in FIG. 2, another component can be added in addition to the components illustrated in FIG. 2 as a modification example. For example, a protective film or a cover member may be attached to the side of the front surface of the polarizing plate PL1 as a protective layer for protecting the polarizing plate PL1 from a flaw or dirt. For example, the present invention is applicable to an example in which an optical film such as a phase difference plate is affixed to the polarizing plate PL1 and the polarizing plate PL2. Alternatively, a method for forming the optical film is applicable to each of the substrate 11 and the substrate 12. As a modification example of FIG. 1, a semiconductor chip in which a driving circuit for supplying a pixel voltage to a pixel electrode PE (see FIG. 3) is formed, for example, may be mounted on a front surface $12f$ of the substrate 12. A system for mounting a semiconductor chip on a glass substrate is referred to as a Chip on glass (COG) system. A part of the driving circuit may be formed in the frame region using an element simultaneously formed when an element for display is formed.

As illustrated in FIG. 3, the liquid crystal display device LCD1 includes a plurality of pixel electrodes PE arranged between the substrate 11 and the substrate 12 and a common electrode CE arranged between the substrates 11 and 12. The liquid crystal display device LCD1 according to the present embodiment is the display device in the horizontal electric field mode, as described above. Thus, each of the plurality of pixel electrodes PE and the common electrode CE is formed in the substrate 12.

In the substrate 12 illustrated in FIG. 3, a circuit mainly for image display is formed in a base material 12st composed of a glass substrate, etc. The substrate 12 includes the front surface 12f positioned on the side of the substrate 11 and a back surface 12b (see FIG. 2) positioned on the opposite side thereof. An active element such as a Thin-Film Transistor (TFT) and the plurality of pixel electrodes PE are formed in a matrix shape on the side of the front surface 12f of the substrate 12. A substrate where the TFT is formed as an active element, e.g., the substrate 12 is referred to as a TFT substrate.

An example illustrated in FIG. 3 illustrates the liquid crystal display device LCD1 in the horizontal electric field mode (specifically, an FFS mode), as described above. Thus, each of the common electrode CE and the pixel electrodes PE is formed on the side of the front surface 12f of the substrate 12. The common electrodes CE is formed on the side of a front surface of the base material 12st in the substrate 12, and is covered with an insulating layer OC2. The plurality of pixel electrodes PE are formed in the insulating layer OC2 on the side of the substrate 11 so as to oppose the common electrode CE via the insulating layer OC2.

The substrate 11 illustrated in FIG. 3 is a substrate in which a color filter CF, which forms an image for color display, is formed in a base material 11st composed of a glass substrate, etc. and has the front surface 11f (see FIG. 2) on the side of the display surface and a back surface 11b positioned on the opposite side of the front surface 11f. The substrate having the color filter CF formed therein, e.g., the substrate 11 is referred to as an opposite substrate because it opposes the above-described TFT substrate via a color filter substrate or a liquid crystal layer when distinguished from the TFT substrate. As a modification example of FIG. 3, a configuration in which the color filter CF is provided in the TFT substrate can also be used.

In the substrate 11, the color filter CF having color filter pixels CFr, CFg, and CFb in three colors, i.e., red (R), green (G), and blue (B) periodically arranged therein is formed on one surface of the base material 11st such as a glass substrate. In a color display device, sub-pixels in three colors, i.e., red (R), green (G), and blue (B) are used as one set, to constitute one pixel, for example. The plurality of color filter pixels CFr, CFg, and CFb in the substrate 11 are arranged at positions opposing respective sub-pixels having the pixel electrodes PE formed in the substrate 12.

Light shielding films BM are respectively formed in boundaries among the color filter pixels CFr, CFg, and CFb in the colors R, G, and B. The light shielding film BM is referred to as a black matrix, and is composed of black resin, for example. The light shielding film BM is formed in a lattice shape in a plan view. In other words, the substrate 11 includes the color filter pixels CFr, CFg, and CFb in the colors R, G, and B formed among the light shielding films BM formed in a lattice shape.

In the present application, the display section DP or the region described as the display region is defined as a region positioned inside with respect to the frame section FL. The frame section FL is a region covered with the light shielding film BM that shields the light irradiated from the light source LS illustrated in FIG. 2. The light shielding film BM is also formed within the display section DP. However, in the display section DP, a plurality of openings are formed in the light shielding film BM. Generally, an end of the opening formed on the side of the most peripheral edge of the display section DP among the openings formed in the light shielding film BM is defined as a boundary between the display section DP and the frame section FL.

The substrate 11 has a resin layer OC1 covering the color filter CF. The light shielding films BM are respectively formed in the boundaries among the color filter pixels CFr, CFg, and CFb in the colors R, G, and B. Thus, an inner side surface of the color filter CF is an uneven surface. The resin layer OC1 functions as a flattening film for flattening the unevenness on the inner side surface of the color filter CF. Alternatively, the resin layer OC1 functions as a protective film for preventing impurities from being diffused into the liquid crystal layer from the color filter CF. The resin layer OC1 can harden a resin material by containing a component to be hardened by applying energy, i.e., a thermosetting resin component or a light hardening resin component in its material.

A liquid crystal layer LCL, in which a display image is formed when a voltage for display is applied between the pixel electrodes PE and the common electrode CE, is provided between the substrate 11 and the substrate 12. The liquid crystal layer LCL modulates light that passes therethrough depending on a state of an applied electric field.

The substrate 11 includes an oriented film AF1 covering the resin layer OC1 on the back surface 11b serving as an interface contacting the liquid crystal layer LCL. The substrate 12 has an oriented film AF2 covering an insulating layer OC2 and the plurality of pixel electrodes PE on the front surface 12f serving as an interface contacting the liquid crystal layer LCL. The oriented films AF1 and AF2 are resin films formed to make initial orientations of liquid crystals included in the liquid crystal layer LCL align, and are composed of polyimide resin, for example.

As illustrated in FIG. 4, the sealing section SL arranged to surround the liquid crystal layer LCL includes a sealing material SLp. The liquid crystal layer LCL is sealed into a region surrounded by the sealing material SLp. That is, the sealing material SLp functions as a sealing material for preventing the liquid crystal layer LCL from leaking out. The sealing material SLp adheres to each of the back surface 11b of the substrate 11 and the front surface 12f of the substrate 12. The substrate 11 and the substrate 12 are adhesively fixed to each other via the sealing material SLp. That is, the sealing material SLp functions as an adhesive member for adhesively fixing the substrates 11 and 12 to each other.

The thickness of the liquid crystal layer LCL illustrated in FIGS. 3 and 4 is significantly smaller than the thicknesses of the substrates 11 and 12. For example, the thickness of the liquid crystal layer LCL is approximately 0.1% to 10% of the thicknesses of the substrates 11 and 12. In an example illustrated in FIGS. 3 and 4, the thickness of the liquid crystal layer LCL is, for example, approximately 3 µm (2.5 µm to 3.5 µm) in the display section DP and, for example, approximately 4 µm (3.5 µm to 4.5 µm) in a surrounding section (from outside the display section DP to inside the sealing section SL illustrated in FIG. 4).

In the present embodiment, the sealing section SL includes a member FS arranged around the liquid crystal layer LCL and extending along an outer edge of the liquid crystal layer LCL, as illustrated in FIGS. 1 and 4. The member FS illustrated in FIGS. 1 and 4 can be formed in one or both of the substrates 11 and 12. An example in which the member FS is formed in the substrate 11 will be described below as a representative example.

The member FS functions as a damping member for suppressing spreading of the oriented film AF1 to a peripheral edge of the substrate 11 when the oriented film AF1 is formed on the back surface 11b of the substrate 11 in processes for manufacturing the liquid crystal display device LCD1. Thus, the member FS is a projecting (convex-shaped) member formed so as to project toward the back surface 11b illustrated in FIG. 11.

If the oriented film AF1 spreads to the peripheral edge on the back surface 11b of the substrate 11, the back surface 11b including the sealing section SL is covered with the oriented film AF1. In this case, the sealing material SLp does not contact the oriented film AF1. This causes a sealing property such as adhesive strength of the sealing section SL or airtightness of a region inside the sealing section SL to decrease. The adhesive strength of the sealing section SL, i.e., sealing strength in the sealing section SL will be described in detail below.

The oriented film AF1 is composed of a resin material having high fluidity such as polyimide resin, as described above. Therefore, unless a portion for damping is formed around the display region, the oriented film AF1 easily spreads to a wide range.

Accordingly, in the present embodiment, the member FS arranged around the liquid crystal layer LCL and extending along an outer edge of the liquid crystal layer LCL is formed as a damping member suppressing the spreading of the oriented film AF1 to the peripheral edge. Thus, the member FS damps the oriented film AF1. That is, the spreading of the oriented film AF1 to the outer side of the member FS (the side of the peripheral edge) can be suppressed. The height of the member FS, i.e., the length in a Z-direction (thickness direction) toward the substrate 12 from the back surface 11b of the substrate 11 illustrated in FIG. 4 is approximately 2.5 μm to 3.4 μm, for example.

In the present embodiment, the member FS is formed in the sealing section SL to reduce the area of the frame section FL. More specifically, a part of the sealing material SLp overlaps a peripheral edge of the oriented film AF1 in a thickness direction inside the member FS, i.e., on the side of the display section DP with respect to the member FS, as illustrated in FIG. 4. On the other hand, the substrate 11 does not spread to the outer side of the member FS, i.e., the oriented film AF1 does not spread to the side of the peripheral edge of the substrate 11. Thus, the other part of the sealing material SLp does not overlap the peripheral edge of the oriented film AF1 but adheres to the resin layer OC1 having the back surface 11b of the substrate 11 outside the member FS, i.e., on the side of the peripheral edge of the substrate 11.

A method for displaying a color image by the liquid crystal display device LCD1 illustrated in FIG. 3 is as follows, for example. More specifically, light emitted from the light source LS is filtered by the polarizing plate PL2, and light passing through the polarizing plate PL2 is incident on the liquid crystal layer LCL. The light incident on the liquid crystal layer LCL is propagated in the thickness direction of the liquid crystal layer LCL (i.e., a direction directed toward the substrate 11 from the substrate 12) by changing a polarization state depending on refractive index anisotropy of a liquid crystal (i.e., birefringence), and is emitted from the substrate 11. At this time, liquid crystal orientation is controlled by an electric field formed by applying a voltage to the pixel electrodes PE and the common electrode CE, and the liquid crystal layer LCL functions as an optical shutter. That is, in the liquid crystal layer LCL, light transmissivity can be controlled for each sub-pixel. Light, which has reached the substrate 11, is subjected to color filtering processing (i.e., processing for absorbing light other than that having a predetermined wavelength) in the color filter CF formed in the substrate 11, and is emitted from the front surface 11f. The light emitted from the front surface 11f reaches a viewer VW via the polarizing plate PL1.

<Details of Sealing Section>

Figure 5:
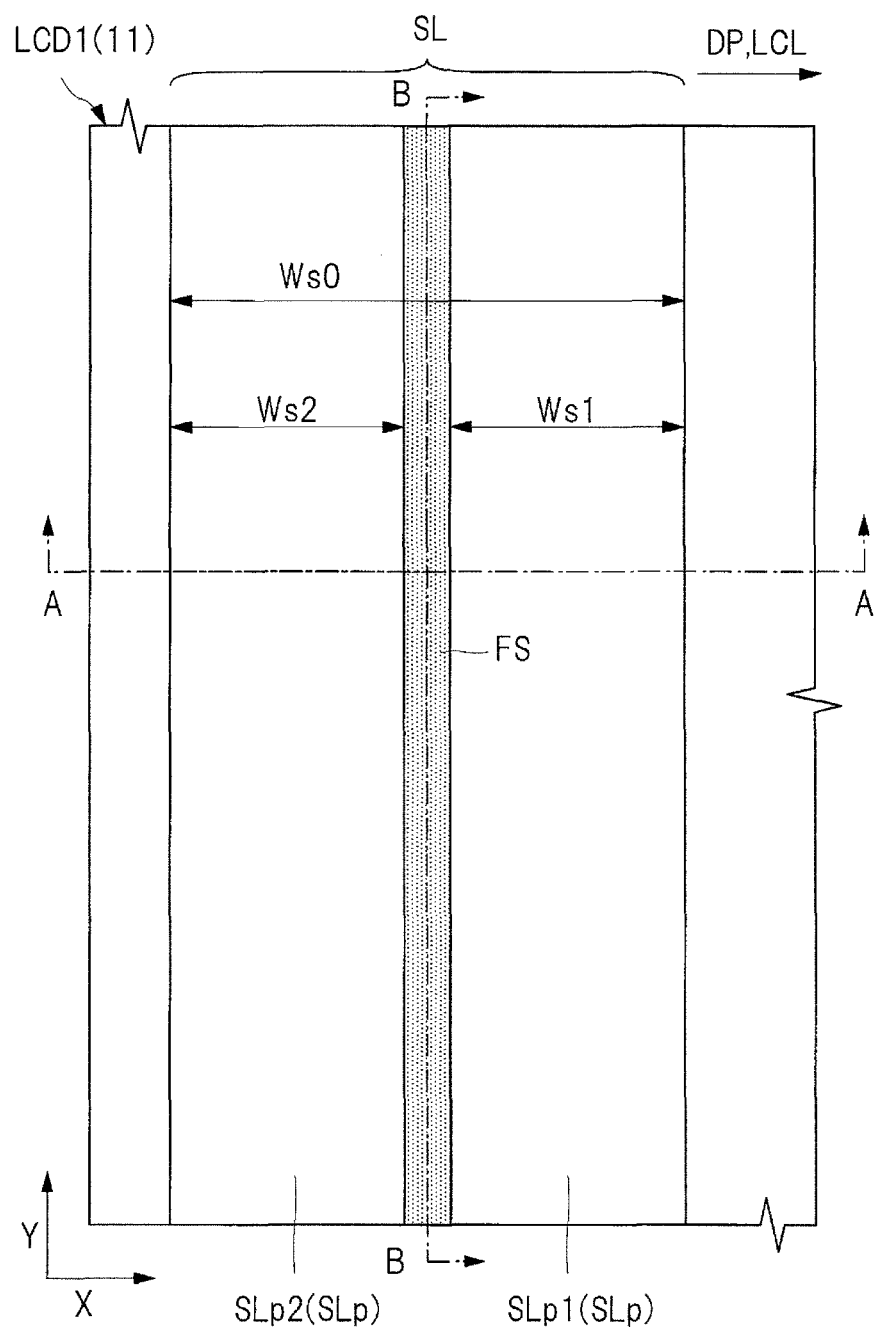
FIG. 5 is an enlarged plan view around a sealing section illustrated in FIG. 1.
Figure 6:
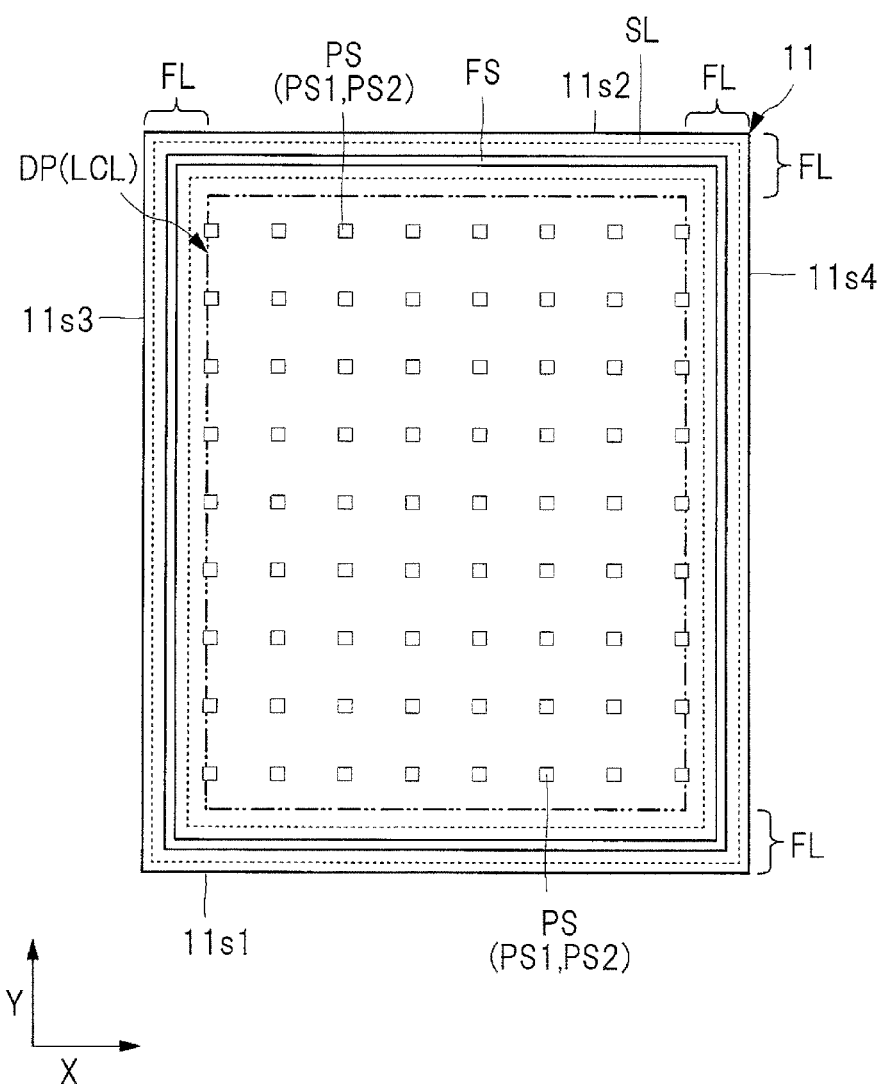
FIG. 6 is a plan view schematically illustrating a plurality of members formed on the side of a back surface of an opposite substrate illustrated in FIGS. 3 and 4.
Figure 18:
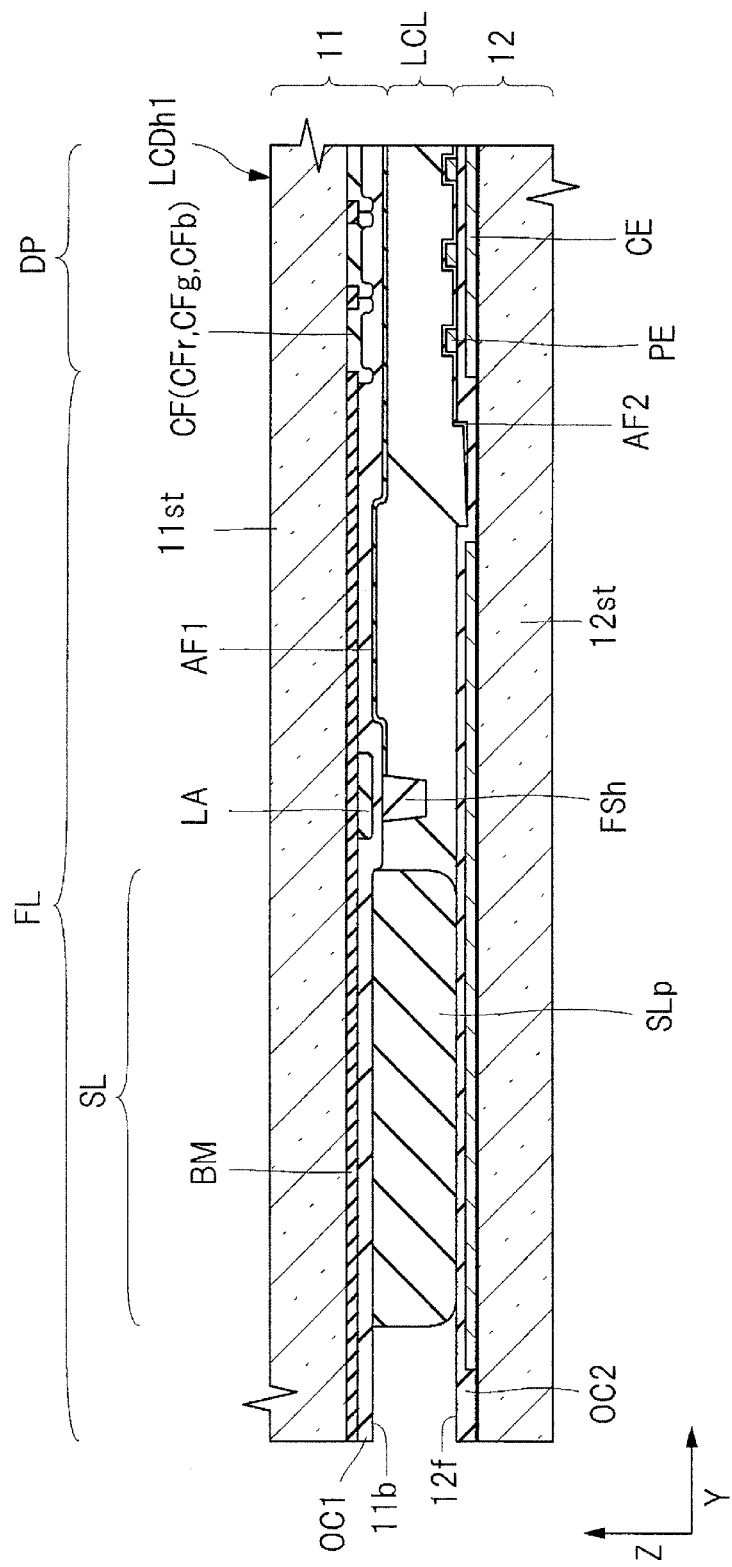
FIG. 18 is an enlarged sectional view illustrating another example of examination different from that illustrated in FIG. 4.
Figure 19:
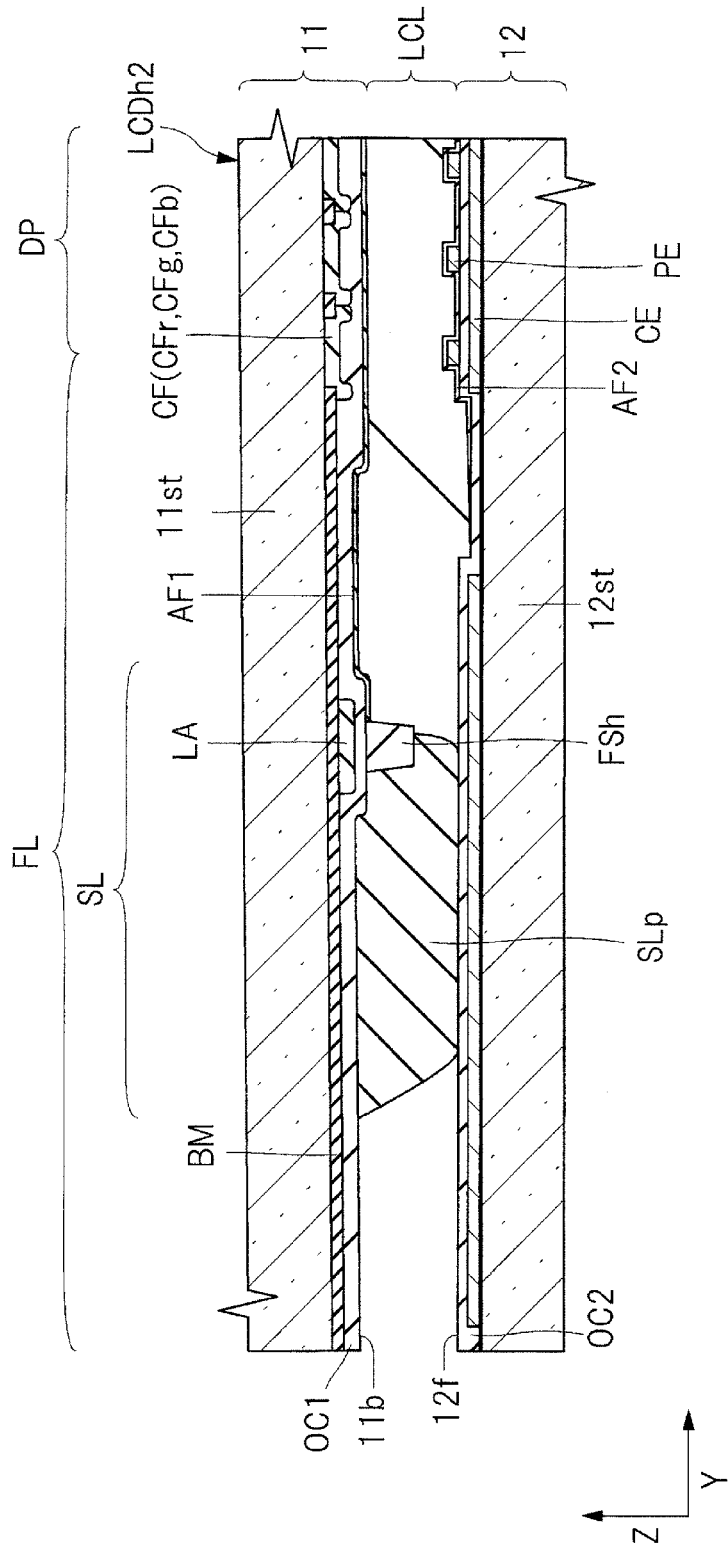
FIG. 19 is an enlarged sectional view illustrating another example of examination different from that illustrated in FIGS. 4 and 18.

Details of the sealing section SL illustrated in FIG. 4 will be described below. In this section, a relationship between the sealing strength in the sealing section SL and the member FS will be described. In this section, the effect of a position of the member FS in the sealing section SL on control of a separation distance between the substrate 11 and the substrate 12 will also be described. FIGS. 18 and 19 are enlarged sectional views respectively illustrating examples of examination other than that illustrated in FIG. 4. FIG. 5 is an enlarged plan view around the sealing section illustrated in FIG. 1. FIG. 6 is a plan view schematically illustrating a plurality of members formed on the side of a back surface of an opposite substrate illustrated in FIGS. 3 and 4. FIG. 5 is an enlarged plan view of the member FS formed on the substrate 11 illustrated in FIG. 4 as viewed from the substrate 12. The member FS illustrated in FIG. 5 is a member arranged between the substrate 11 and the substrate 12 illustrated in FIG. 4. However, to explicitly indicate a planar position of the member FS, the member FS is indicated by a solid line and is given a dot pattern in FIG. 5.

First, the sealing strength in the sealing section SL is defined by adhesive strength between components respectively formed in the substrate 11 and the substrate 12 and adhesive strength between the components and the sealing material SLp. Each of adhesive strength between the sealing material SLp and the oriented film AF1 and adhesive strength between the oriented film AF1 and the resin layer OC1 is lower than adhesive strength between the sealing material SLp and the resin layer OC1. Similarly, each of adhesive strength between the sealing material SLp and the oriented film AF2 and adhesive strength between the oriented film AF2 and the insulating layer OC2 is lower than adhesive strength between the sealing material SLp and the insulating layer OC2.

Therefore, an adhesion (contact) area between the sealing material SLp and the resin layer OC1 is preferably increased from the viewpoint of improving adhesive strength between the substrate 11 and the sealing material SLp. An adhesion area between the sealing material SLp and the insulating layer OC2 is preferably increased from the viewpoint of improving adhesive strength between the substrate 12 and the sealing material SLp.

The oriented films AF1 and AF2 are composed of a material having a high fluidity such as polyimide resin. Thus, the oriented films AF1 and AF2 easily spread to the periphery of the display section DP when formed to cover the entire display section DP. Therefore, a damping member FS is preferably provided between the sealing section SL and the display section DP, from the viewpoint of increasing an adhesive area between the sealing material SLp and the insulating layer OC1. For example, a member FSh included in a display device LCDh1 illustrated in FIG. 18 is formed between the sealing section SL and display section DP. Like the display device LCDh1 illustrated in FIG. 18, if a great distance can be ensured between the sealing section SL and the display section DP, the damping member FSh is provided between the sealing section SL and the display section DP, so that the adhesion area between the sealing material SLp and the resin layer OC1 can be maximized.

An approach to reducing the area of the frame section FL provided around an effective display region has been recently examined from the viewpoint of improving the design of the display device, miniaturizing the display device, or making the display device lightweight. That is, there is a request for a technique for reducing the area of the frame section FL illustrated in FIG. 1 and increasing an area occupied by the display section DP in a plan view.

As illustrated in FIG. 1, the sealing section SL is formed in the frame section FL. Therefore, if the area of the frame section FL decreases, the distance between the sealing section SL and the display section DP decreases. Thus, the member FSh is provided in the sealing section SL, like in a liquid crystal display device LCDh2 illustrated in FIG. 19. When the damping member FSh is provided in the sealing section SL, like in the liquid crystal display device LCDh2, the member FSh and the sealing material SLp contact each other.

More specifically, if the damping member FSh is provided in the sealing section SL, the damping member FSh inhibits the sealing material SLp from spreading when the sealing material SLp is pushed out in processes for manufacturing the liquid crystal display device LCDh2. In this case, the sealing material SLp bulges to become thick in its part that is inhibited from spreading by the member FSh, as illustrated in FIG. 19. As a result, a separation distance between the substrate 11 and the substrate 12 varies depending on the degree of the bulge of the sealing material SLp. Thus, the thickness of the liquid crystal layer LCL becomes difficult to control.

In this way, if the thickness of the liquid crystal layer LCL is not stabilized and becomes non-uniform in a plan view, positions of the color filter CF and the pixel electrodes PE may deviate from each other. When the sealing material SLp insufficiently spreads, an adhesion area between the sealing material SLp and the substrate 11 or between the sealing material SLp and the substrate 12 may decrease.

The inventors of the present application have examined the above-mentioned problem, to find out a configuration of the liquid crystal display device LCD1 described in the present embodiment. More specifically, the member FS in the liquid crystal display device LCD1 according to the present embodiment is formed at the center in a width direction of the sealing section SL extending to surround a periphery of the liquid crystal layer, as illustrated in FIG. 1. Although details will be described below, a structure of the sealing section SL is formed by applying the sealing material SLp onto the member FS, and then pushing out the sealing material SLp toward both adjacent sides of the member FS, as illustrated in FIG. 4. In the present embodiment, any member projecting toward the substrate 12 from the back surface 11b of the substrate 11, other than the member FS, is not formed in the sealing section SL.

The spreading of the sealing material SLp is more difficult to be inhibited than in a structure of the liquid crystal display device LCDh2 described with reference to FIG. 19. As a result, the thickness of the sealing material SLp is made substantially uniform in a direction in which the sealing section SL surrounding a periphery of the display section DP illustrated in FIG. 1 extends. Therefore, the thickness of the liquid crystal layer LCL can be stably controlled according to the present embodiment.

A method for defining the thickness of the liquid crystal layer LCL, i.e., the separation distance between the substrate 11 and the substrate 12 includes some methods. For example, in the present embodiment, the sealing material SLp includes a glass fiber in addition to a resin material, and the separation distance between the substrate 11 and the substrate 12 is defined by the thickness of the glass fiber. As a modification example of the present embodiment, a spacer member for defining the separation distance between the substrate 11 and the substrate 12 may be formed in a section other than the sealing section SL illustrated in FIG. 4. In any case, when the sealing material SLp is inhibited from spreading, the separation distance between the substrate 11 and the substrate 12 in the display section DP particularly tends to become larger than a designed value. However, the sealing material SLp can be stably spread according to the present embodiment, as described above. Therefore, even in either a method depending on the thickness of the glass fiber or a method using the spacer member, described above, the separation distance between the substrate 11 and the substrate 12 can be stably controlled according to the present embodiment.

The sealing section SL in the liquid crystal display device LCD1 according to the present embodiment is formed by pushing out the sealing material SLp from the top of the member FS toward the both adjacent sides of the member FS, as described above. Thus, the sealing material SLp is formed on the both adjacent sides of the member FS, i.e., both the adjacent side of the liquid crystal layer LCL with respect to the member FS and the adjacent side of the peripheral edge with respect to the member FS. In the example illustrated in FIG. 4, the height (i.e., the thickness) of the member FS is smaller than the separation distance between the substrate 11 and the substrate 12. Thus, a part of the sealing material SLp is formed between the member FS and the front surface 12f of the substrate 12. In other words, the member FS is sealed in the sealing material SLp. Thus, the member FS does not contact the liquid crystal layer LCL, and the sealing material SLp is interposed between the member FS and the liquid crystal layer LCL, as illustrated in FIG. 4.

The member FS is a damping member for suppressing the spreading of the oriented film AF1, as described above. Thus, in a region on the side of the display section DP with respect to the member FS, the sealing material SLp and the oriented film AF1 overlap each other in the thickness direction, as illustrated in FIG. 4.

If the member FS can damp the oriented film AF1, the oriented film AF1 does not spread to the outer side of the member FS, i.e., to the opposite side of the display section DP with respect to the member FS. Therefore, if the sealing material SLp can be reliably formed outside the member FS, the sealing material SLp and the resin layer OC1 can be made to adhere to each other outside the sealing material SLp.

If the sealing material SLp can be made to firmly adhere to the substrate 11 and the substrate 12 outside the member FS, like in the present embodiment, required adhesive strength can be ensured even if the sealing material SLp and the oriented film AF1 overlap each other in the thickness direction inside the member FS. That is, if the sealing material SLp can be stably pushed out to the both adjacent sides of the member FS, required adhesive strength can be ensured.

As described above, in the sealing section SL formed by pushing out the sealing material SLp toward the both adjacent sides of the member FS from the top of the member FS, the member FS exists substantially at the center in the width direction of the sealing section SL, illustrated as the X-direction in FIG. 5. More specifically, the sealing material SLp has a portion SLp1 arranged on the side of the liquid crystal layer LCL of the member FS and a portion SLp2 arranged on the opposite side of the liquid crystal layer LCL of the member FS. In an example illustrated in FIG. 5, the width Ws1 of the portion SLp1 and the width Ws2 of the portion SLp2 are substantially equal. In other words, a ratio of the width Ws1 of the portion SLp1 to the width Ws2 of the portion SLp2 is five to five.

The ratio of the width Ws1 to the width Ws2 includes various modification examples. For example, the width Ws1 and the width Ws2 may respectively have different values due to processing accuracy in applying the sealing material SLp or processing accuracy in pushing out the sealing material SLp. Therefore, respective preferable ranges of the width Ws1 and the width Ws2 illustrated in FIG. 5 will be described below.

As described above, an adhesion area between the sealing material SLp and the substrate 11 is preferably increased from the viewpoint of improving the sealing strength between the substrate 11 and the substrate 12 illustrated in FIG. 4. That is, a value of the width Ws2 illustrated in FIG. 5 has a preferable range from the viewpoint of ensuring required sealing strength. In the example of the present embodiment, the width Ws0 is approximately 0.8 mm, while the width Ws2 is preferably approximately 0.3 mm or more.

If a material for improving an adhesion property between the sealing material SLp and the resin layer OC1 illustrated in FIG. 4 is selected, required sealing strength can be ensured even if the width Ws2 is approximately 0.15 mm. In this case, the width Ws0 of the entire sealing section SL can be reduced. That is, the width of the frame section FL illustrated in FIG. 4 can be reduced.

As described above, a specific numerical value of the width Ws2 changes depending on the size of the liquid crystal display device and a constitutional material for the sealing section SL. However, considering that the width of the frame section FL is reduced, a ratio of the preferable width Ws2 to the width Ws0 of the entire sealing section SL can be defined. More specifically, the width Ws2 of the portion SLp2 is preferably 25% or more, more preferably 35% or more, and particularly preferably 40% or more of the width Ws0 of the entire sealing section SL.

An amount of the sealing material SLp spreading toward the portion SLp1 by getting over the member FS from the portion SLp2 illustrated in FIG. 5 is preferably reduced from the viewpoint of inhibiting the sealing material SLp from spreading and suppressing an increase in the thickness of the sealing material SLp on the member FS, as described with reference to FIG. 19. Although the degree of contribution of the portion SLp1 of the sealing material SLp to the sealing strength is lower than that of the portion SLp2, a value of the width Ws1 is preferably not made extremely small, considering that the thickness of the sealing material SLp is controlled. More specifically, the width Ws1 of the portion SLp1 illustrated in FIG. 5 is preferably 25% or more, more preferably 35% or more, and particularly preferably 40% or more of the width Ws0 of the entire sealing section SL.

As illustrated in FIG. 4, in the present embodiment, the member FS does not contact the front surface 12f of the substrate 12. Thus, the sealing material SLp exists between the member FS and the substrate 12. In this case, when the sealing material SLp is pushed out, a pressing force required to get over the member FS can be reduced. Therefore, a structure in which the member FS does not contact the front surface 12f of the substrate 12 is preferable, as illustrated in FIG. 4, from the viewpoint of easily controlling the thickness of the sealing material SLp.

In the display section DP illustrated in FIG. 1, the display section DP preferably has a plurality of spacer members PS, as schematically illustrated in FIG. 6, from the viewpoint of keeping the separation distance between the substrate 11 and the substrate 12. The plurality of spacer members PS includes a plurality of spacer members PS1 having a first thickness contacting both the substrate 11 and the substrate 12 illustrated in FIG. 4. When the substrate 11 and the substrate 12 illustrated in FIG. 4 are adhesively fixed to each other by arranging the plurality of spacer members PS1 in the display section DP in this way, the separation distance between the substrate 11 and the substrate 12 is defined by the thickness of the spacer member PS1. Therefore, if the plurality of spacer members PS1 are arranged in the display section DP, the separation distance between the substrate 11 and the substrate 12 illustrated in FIG. 4, i.e., the thickness of the liquid crystal layer LCL can be made uniform.

The plurality of spacer members PS includes a plurality of spacer members PS2 having a second thickness smaller than the first thickness of the spacer member PS1. Each of the plurality of spacer members PS2 has the same thickness as that of the member FS illustrated in FIG. 4, for example, and contacts the substrate 11 and does not contact the substrate 12. When the plurality of spacer members PS having different thicknesses are thus arranged on the display section DP, deterioration in display quality can be suppressed even if the display section DP is deflected.

In recent years, an applied example of the display device has included a display device with an input device (also called a touch panel) that inputs information by bringing an input jig such as a person's finger closer to a display screen. When the display screen is pressed by the input jig, the liquid crystal display device LCD1 may be deflected. However, when the plurality of spacer members PS1 are provided in the display section DP, like in the present embodiment, the substrate 11 illustrated in FIG. 4 can be inhibited from being deflected. When the plurality of spacer members PS2 are provided in the display section DP, an increase in an amount of deflection of the substrate 11 illustrated in FIG. 4 can be suppressed.

The number of spacer members PS may be determined depending on the size of the liquid crystal display device. The shape of each of the plurality of spacer members PS is not limited to the shape illustrated in FIG. 6, and includes various modification examples such as a cylindrical shape, an elliptic cylindrical shape, and a polygonal columnar shape in addition to a quadrangular columnar shape illustrated in FIG. 6.

The spacer members PS are formed in a dispersed manner in the display section DP, as illustrated in FIG. 6. Thus, the planar size of each of the spacer members PS may be small. In the example illustrated in FIG. 6, for example, the length of one side is 30 μm or less, and is preferably 7 to 15 μm.

If the plurality of spacer members PS of a small planar size are arranged in a dispersed manner in the display section DP, as described above, the spacer members PS do not become an inhibiting factor in applying the oriented film AF1 and the liquid crystal layer LCL illustrated in FIGS. 3 and 4. Even if some of the plurality of spacer members PS are respectively formed at positions, overlapping the sealing section SL, of the frame section FL, for example, the spreading of the sealing material SLp (see FIG. 4) is not easily inhibited.

The spacer member PS is composed of a resin material transparent to visible light. Thus, even if the plurality of spacer members PS are formed in the display section DP, the spacer members PS do not easily cause disturbance of a display image. The spacer member PS is composed of the same member as the convex-shaped member FS, for example. When the member FS is formed, the plurality of spacer members PS can be collectively formed.

As described above, in the present embodiment, the member FS is formed in the substrate 11. Spreading of the oriented film AF2 formed in the substrate 12, as illustrated in FIG. 4, is suppressed by a structure described below, for example. More specifically, in an insulating layer OC2 of the substrate 12, a groove TR1 extending in a direction in which the sealing section SL extends is formed between the sealing section SL and the display section DP. By forming the groove TR1, spreading of the oriented film AF2 is easily stopped within the groove TR1, as illustrated in FIG. 4.

On the other hand, in the case of the substrate 11, the light shielding film BM needs to be provided in the frame section FL. If the groove TR1 is formed in the resin layer OC1, the thickness of the light shielding film BM needs to be considered. Thus, the depth of the groove TR1 becomes smaller than when the groove TR1 may be formed in the substrate 12. Therefore, in the substrate 11, spreading of the oriented film AF1 is more advantageously suppressed by forming the member FS.

As a modification example of the present embodiment, there is an embodiment in which the member FS is formed in the substrate 12. However, if the member FS is formed in both the substrate 11 and the substrate 12, when the sealing material SLp is pushed out, the member FS formed in each of the substrates 11 and 12 may inhibit the sealing material SLp from spreading. Therefore, the opposing members FS need to be made to deviate from each other, or their respective heights need to be made different from each other. If the member FS is formed in the substrate 12 and the member FS is not formed in the substrate 11, spreading of the oriented film AF1 is preferably suppressed by forming a groove corresponding to the groove TR1 illustrated in FIG. 4. If the spreading of the oriented film AF1 is suppressed by forming the groove TR1 in the resin layer OC1 in the substrate 11, the resin layer OC1 is preferably made thick.

<Method for Manufacturing Liquid Crystal Display Device>

Figure 7:
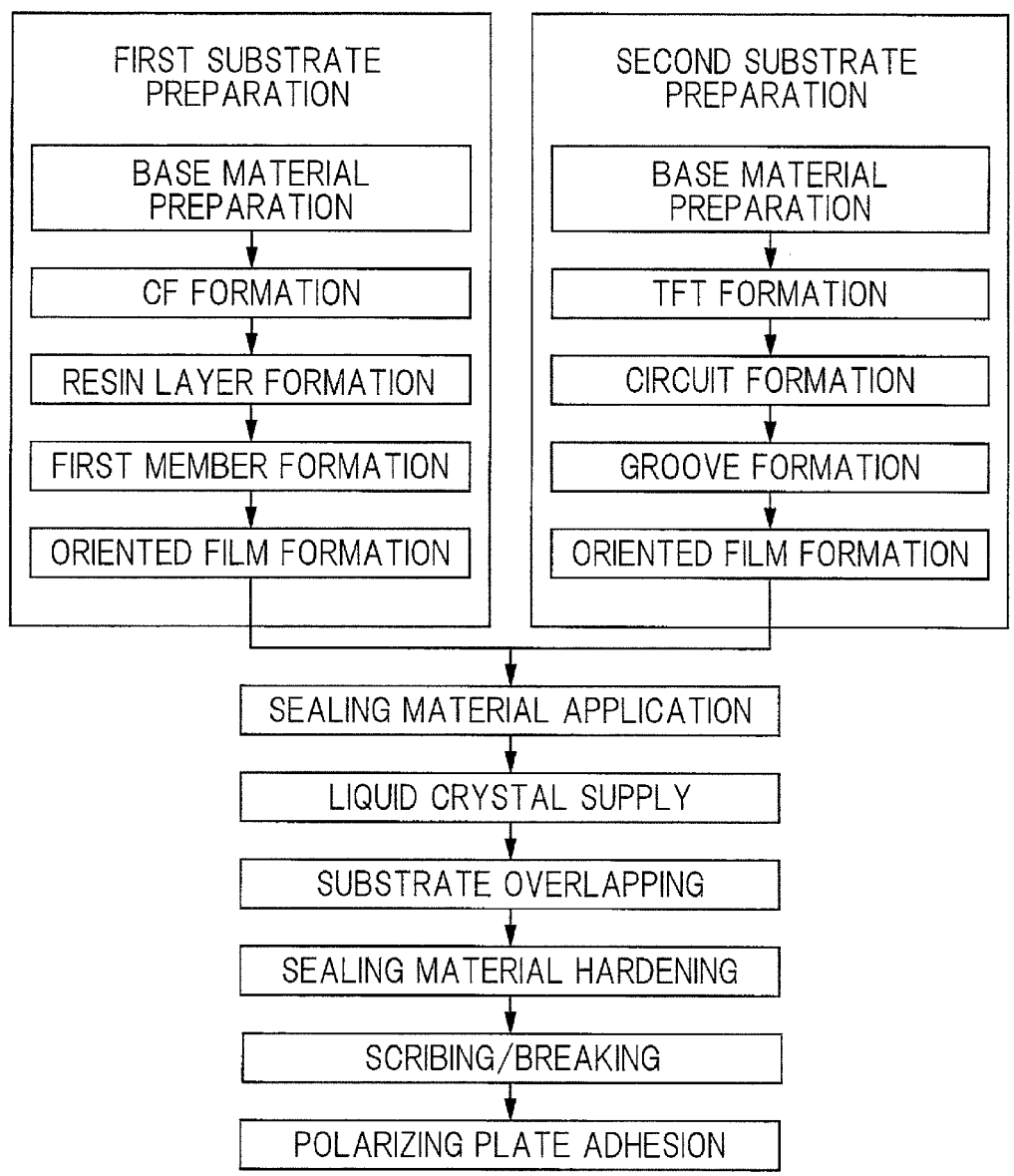
FIG. 7 is an assembly flowchart illustrating the outline of processes for manufacturing the liquid crystal display device illustrated in FIG. 1.

A method for manufacturing the liquid crystal display device described in the present embodiment will be described below. In the following description, a method for manufacturing the liquid crystal display device LCD1 illustrated in FIG. 1 will be described as a representative example. FIG. 7 is an assembly flowchart illustrating the outline of the processes for manufacturing the liquid crystal display device LCD1 illustrated in FIG. 1. Members referred to in the following description will be described in detail by referring to FIGS. 1 to 6, described above, as needed.

As illustrated in FIG. 7, the method for manufacturing the liquid crystal display device according to the present embodiment includes a first substrate preparation process for preparing the substrate 11 illustrated in FIG. 3 and a second substrate preparation process for preparing the substrate 12 illustrated in FIG. 3. The method of manufacturing the liquid crystal display device according to the present embodiment includes a sealing material application process, a liquid crystal supply process, a substrate overlapping process, a sealing material hardening process, and a scribing/breaking process.

In the first substrate preparation process illustrated in FIG. 7, the opposite substrate corresponding to the substrate 11 illustrated in FIGS. 3 and 4 is prepared. In the first substrate preparation process, the base material 11st composed of a glass substrate, for example, is prepared (a base material preparation process). After the base material preparation process, the light shielding film BM and the plurality of color filters CF are formed on one surface of the base material 11st (a CF formation process). The light shielding film BM is also formed in not only the display section DP, in but also the frame section FL, as illustrated in FIG. 4. In this process, a member LA may be further formed on the light shielding film BM at a position, which overlaps the member FS in the thickness direction, of the sealing section SL, as illustrated in FIGS. 4 and 6. The member LA is a height adjustment member for adjusting the height of the resin layer OC1 at a position where the member FS is formed. The member LA can be formed of the same resin material as that of the color filter CF, for example.

After the CF formation process, the resin layer OC1 is formed to cover the plurality of color filters CF (a resin layer formation process). The color filters CF and the light shielding film BM are covered with the resin layer OC1, so that the color filters CF and the light shielding film BM are protected. When the resin layer OC1 is formed to cover the color filters CF, the back surface 11b of the substrate 11 can be flattened.

After the resin layer formation process, the member FS is formed (a first member formation process). The member FS can be formed through a photolithography process including an exposure process and a removal process for chemically removing an unrequired portion, like the color filter CF and the light shielding film BM. When the member FS is formed, the spacer members PS illustrated in FIG. 6 can be collectively formed. If the spacer members PS1 and the spacer members PS2, which differ in thickness, are formed, as described above, the exposure may be performed a plurality of times. If a plurality of masks, which differ in light transmissivity, are stacked on a region where the plurality of spacer members PS is formed before the exposure process, and the exposure process is then implemented, so that the spacer members PS1 and the spacer members PS2, which differ in thickness, can be collectively formed by performing exposure processing once.

After the first member formation process, the oriented film AF1 is formed on the side of the back surface 11b of the substrate 11 (a oriented film formation process). In the oriented film formation process, after polyimide resin serving as a raw material for the oriented film AF1, for example, is applied, the oriented film AF1 can be formed by rubbing processing. The rubbing processing may be replaced with a photo-alignment method for irradiating a polymer film with ultraviolet rays and selectively reacting a polymer chain in a polarization direction to form the oriented film AF1.

A method for applying the polyimide resin can include a screen printing system or an inkjet system, for example. If the polyimide resin is applied using the inkjet system, the oriented film AF1 more easily spreads therearound than using the screen printing system. However, according to the present embodiment, the member FS is formed to surround the periphery of the display section, as illustrated in FIG. 1, before the oriented film formation process. Thus, spreading of the oriented film AF1 to the outer side of the member FS can be suppressed.

In the oriented film formation process, the oriented film AF1 spreads into a region surrounded by the member FS, and is damped by the member FS. In other words, the oriented film formation process includes a process for damping the spreading of the oriented film AF1 by the member FS, so that the peripheral edge of the oriented film AF1 after the oriented film formation process contacts the member FS, as illustrated in FIG. 4. However, the peripheral edge of the oriented film AF1 may not contact the member FS due to a positional deviation of a printing plate or use of a small printing plate.

As described above, according to the present embodiment, an example in which no electrode and wiring are formed in the substrate 11 will be described. However, if an electrode and a wiring are formed in the substrate 11 as a modification example, the electrode is formed in the first substrate preparation process illustrated in FIG. 7. A timing at which the electrode is formed includes various timings. However, the electrode is preferably formed before the first member formation process, from the viewpoint of forming the member FS with high accuracy.

In the second substrate preparation process illustrated in FIG. 7, the TFT substrate corresponding to the substrate 12 illustrated in FIGS. 3 and 4 is prepared. In the second substrate preparation process, the base material 12st composed of a glass substrate, for example, is first prepared (a base material preparation process). After the base material preparation process, the TFT serving as a thin film having a plurality of transistors serving as active elements is formed on one surface of the base material 12st (a TFT formation process).

After the TFT formation process, a wiring electrically connected to the TFT, and the common electrode CE and the pixel electrodes PE illustrated in FIG. 3 are formed (a circuit formation process). The common electrode CE and the pixel electrodes PE are composed of a transparent electrode material such as indium tin oxide (ITO). In the example illustrated in FIG. 3, after the common electrode CE is formed, the insulating layer OC2 is formed to cover the common electrode CE, and the plurality of pixel electrodes PE are further formed on the insulating layer OC2. The insulating layer OC2 may be provided between the common electrode and the base material 12st. In this process, the member LA may be formed at a position, which overlaps the member FS in the thickness direction, of the sealing section SL, as illustrated in FIG. 4. The member LA is a height adjustment member for adjusting the height of the resin layer OC2 at a position where the member FS is formed. The member LA can be formed of the same material such as ITO as that for the common electrode CE, for example.

If the groove TR1 is formed between the display section DP and the sealing section SL in the substrate 12, as illustrated in FIG. 4, the groove TR1 is formed after the circuit formation process illustrated in FIG. 7, for example (a groove formation process). In this process, a part of the insulating layer OC2 is removed in a direction in which the sealing section SL extends, for example, to form the groove TR1. However, if the member LA is formed in the substrate 12, as illustrated in FIG. 4, the insulating layer OC2 is formed in accordance with a shape of the member LA. Therefore, a position of the groove TR1 and its depth can be adjusted to some extent by adjusting a position where the member LA is formed and its height. If the depth of the groove TR1 can be set to a sufficient depth even if a part of the insulating layer OC2 is not removed, as described above, the groove TR1 can be formed when the insulating layer OC2 is formed. Thus, this process can be omitted.

After the groove formation process, the oriented film AF2 is formed on the side of the front surface 12f of the substrate 12 (an oriented film formation process). In the oriented film formation process, after polyimide resin serving as a raw material for the oriented film AF2, for example, is applied, the oriented film AF2 can be formed by rubbing processing. The rubbing processing may be replaced with a photo-orientation method for irradiating a polymer film with ultraviolet rays and selectively reacting a polymer chain in a polarization direction to form the oriented film AF2.

Figure 8:
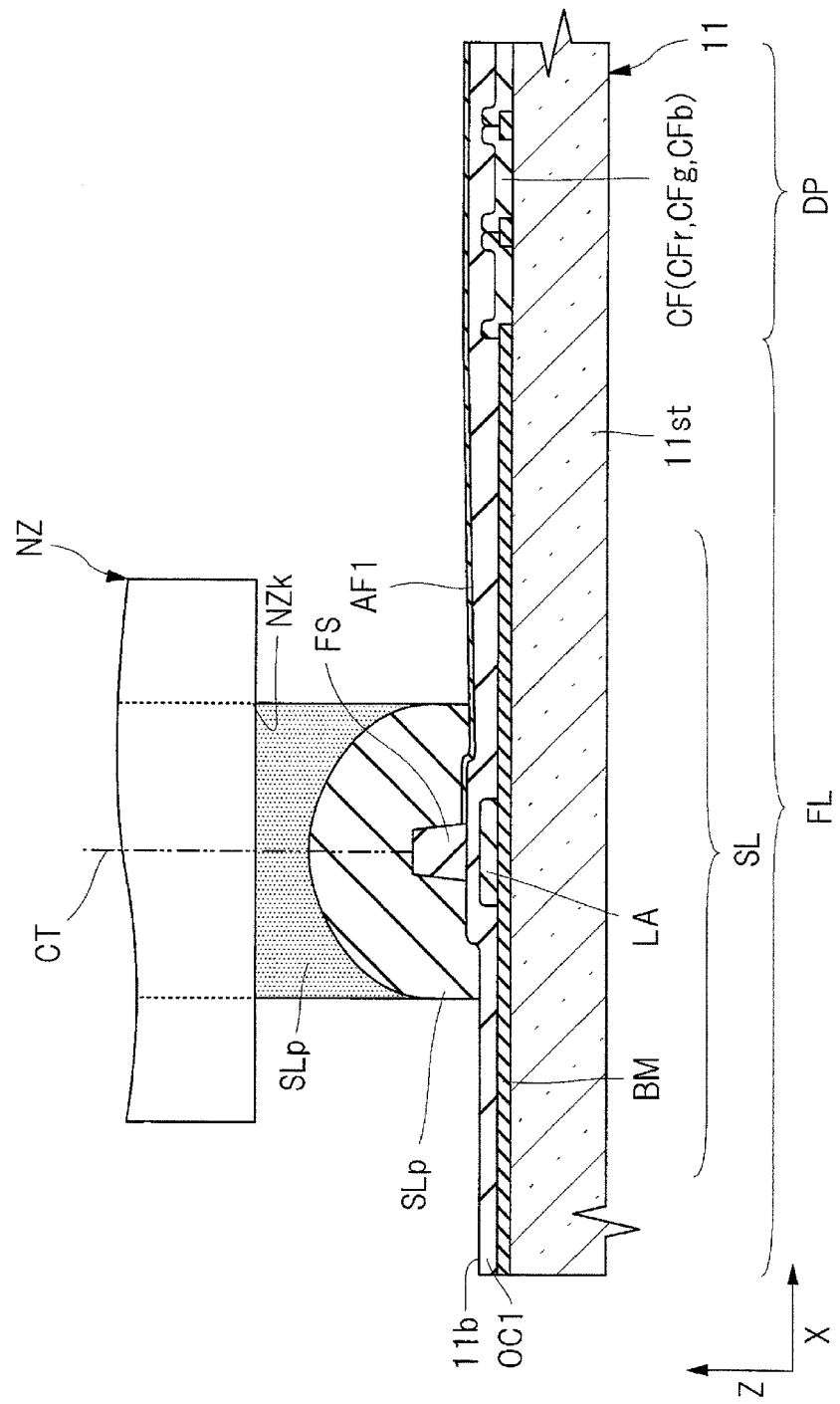
FIG. 8 is an enlarged sectional view illustrating a sealing material that is applied by being discharged from a nozzle in a sealing material application process illustrated in FIG. 7.
Figure 9:
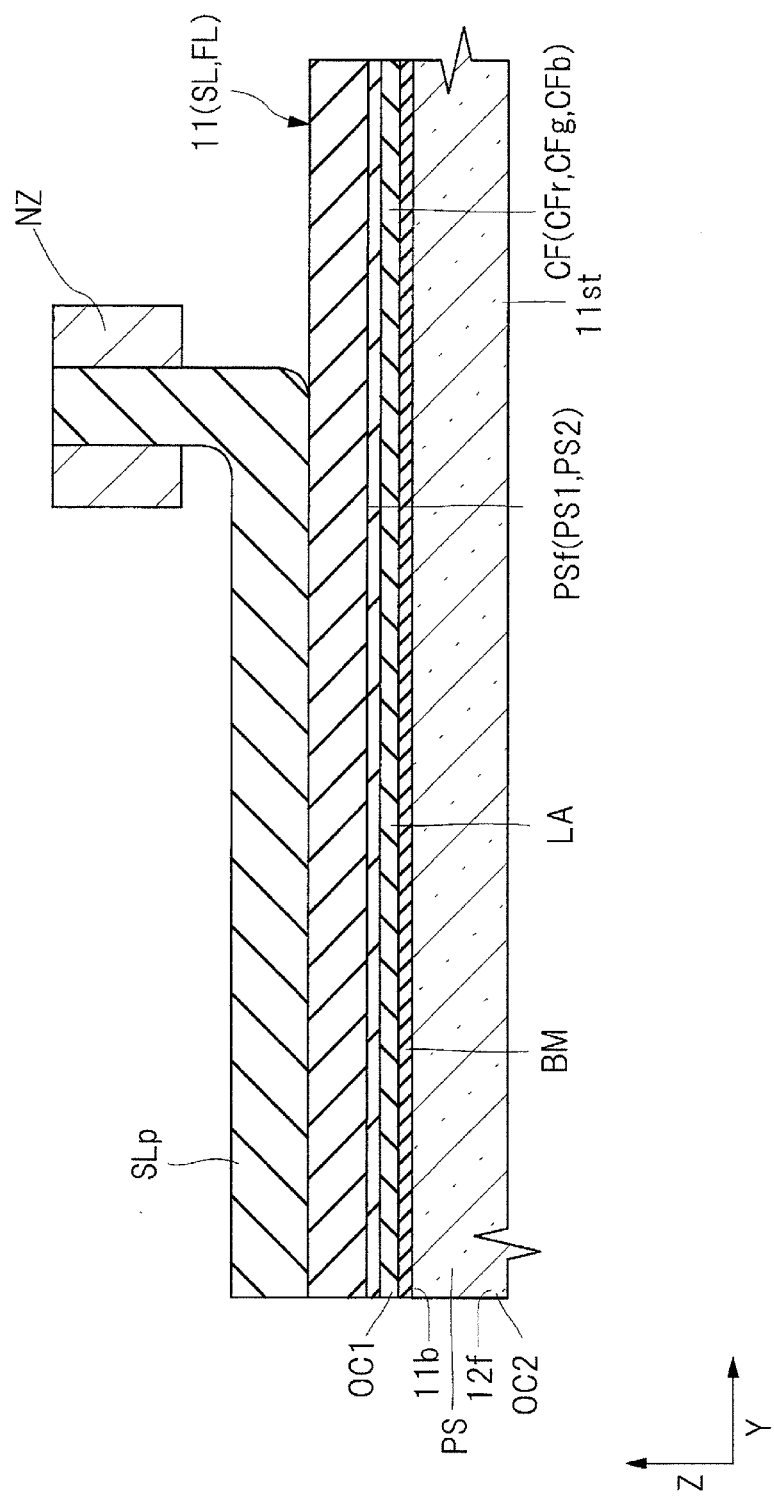
FIG. 9 is an enlarged sectional view along a movement direction of the nozzle illustrated in FIG. 8.

In a sealing material application process illustrated in FIG. 7, a sealing material SLp illustrated in FIG. 8 is applied to surround the display section DP in the substrate 11 or the substrate 12. FIG. 8 is an enlarged sectional view illustrating a sealing material that is applied by being discharged from a nozzle in the sealing material application process illustrated in FIG. 7. FIG. 9 is an enlarged sectional view along a movement direction of the nozzle illustrated in FIG. 8.

FIG. 8 corresponds to an enlarged cross section along a line A-A illustrated in FIG. 5, and FIG. 9 corresponds to an enlarged cross section along a line B-B illustrated in FIG. 5. FIG. 8 is an enlarged sectional view illustrating the sealing material SLp that has been applied, in which the nozzle NZ has already moved to another position at the time point where the sealing material SLp has been formed in a shape as illustrated in FIG. 8. However, FIG. 8 illustrates how the sealing material SLp is discharged from the nozzle NZ. Thus, a part of the nozzle NZ and the sealing material SLp discharged from an opening NZk of the nozzle NZ are illustrated as an enlarged side view. In FIG. 8, to explicitly indicate a positional relationship between the center of the opening NZk of the nozzle NZ and the member FS, a virtual line extending toward the member FS from the center CT of the opening NZk of the nozzle NZ is indicated by a two-dot and dash line.

In the sealing material application process, the nozzle NZ is moved along a direction in which the member FS extends while the paste-shaped sealing material SLp is discharged from the nozzle NZ, as illustrated in FIGS. 8 and 9. In the substrate overlap process illustrated in FIG. 7, an amount of the sealing material SLp, which moves over the member FS in a substrate overlap process, is preferably decreased from the viewpoint of suppressing inhibition of spreading of the sealing material SLp by the member FS.

Thus, as illustrated in FIG. 8, in this process, the sealing material SLp is preferably applied to stride over the member FS in the width direction of the member FS (a direction perpendicular to the direction in which the member FS extends, i.e., the X-direction in the example illustrated in FIG. 8). For the sealing material SLp to be applied to stride over the member FS, the opening diameter of the opening NZk serving as a discharge port of the nozzle NZ is larger than at least the width of the member FS. In the example illustrated in FIG. 8, the opening diameter of the nozzle NZ is approximately 0.10 mm to 0.25 mm.

To reduce an amount of the sealing material SLp, which moves over the member FS in the substrate overlap process illustrated in FIG. 7, the center in the width direction of the applied sealing material SLp is preferably arranged at a position overlapping the member FS. Therefore, the sealing material SLp is preferably discharged while the center CT of the opening NZk of the nozzle NZ is positioned above the member FS.

However, the above-mentioned relationship between the center CT of the opening NZk of the nozzle NZ and the member FS represents a preferable relationship as a setting value in the manufacturing processes. In the actual manufacturing processes, the center CT of the opening NZk of the nozzle NZ may not overlap the member FS due to the effect of processing accuracy such as alignment accuracy between the nozzle NZ and the substrate 11 or discharge accuracy of the sealing material SLp from the nozzle NZ. When the center CT of the opening NZk of the nozzle NZ is set to be arranged on the member FS in the sealing material application process, as described above, however, the degree of positional deviation between the center in the width direction of the applied sealing material SLp and the member FS can be reduced.

In the sealing material application process according to the present embodiment, the sealing material SLp is applied to stride over the member FS, as described above. Thus, the sealing material SLp is applied on the side of the display section DP with respect to the member FS and on the side of the peripheral edge (the opposite side of the display section DP) with respect to the member FS. In the example illustrated in FIG. 8, a state where the sealing material SLp adheres to the upper surface and both the side surfaces of the member FS is illustrated. However, in a stage of the sealing material application process, a clearance may occur between a side surface of the member FS and the sealing material SLp.

In the liquid crystal supply process illustrated in FIG. 7, a liquid crystal is then dropped so that the display section DP between the substrate 11 and the substrate 12 is filled. In the liquid crystal supply process, a region surrounded by the sealing material SLp illustrated in FIG. 8 is filled with the liquid crystal.

In the substrate overlapping process illustrated in FIG. 7, the substrate 11 and the substrate 12 are overlapped such that the back surface 11b of the substrate 11 and the front surface 12f of the substrate 12 oppose each other, as illustrated in FIG. 3. At this time, the plurality of pixel electrodes PE formed in the substrate 12 and the plurality of color filters CF in the substrate 11 are respectively overlapped so as to oppose each other.

In the substrate overlapping process, either one of the substrate 11 and the substrate 12 is pressed against the other substrate or both the substrates are pressed against each other, in a direction in which the substrates 11 and 12, which are oppositely arranged, come closer to each other. Thus, the sealing material SLp illustrated in FIG. 8 is pushed out toward the both adjacent sides of the member FS.

At this time, according to the present embodiment, the sealing material SLp is applied to stride over the member FS. Thus, in the present embodiment, in the substrate overlap process, the sealing material SLp hardly flows to stride over the member FS. In the sealing section SL, any member, inhibiting the sealing material SLp from spreading, other than the member FS is not formed. Therefore, the sealing material SLp spreads toward the entire sealing section SL.

If the sealing material SLp can thus spread to the entire sealing section SL without being inhibited from spreading, the sealing material SLp and the resin layer OC1 can be made to adhere to each other outside the member FS. Thus, the adhesive strength between the substrate 1 and the sealing material SLp can be improved.

If the sealing material SLp is not inhibited from spreading, local bulge of the sealing material SLp can also be suppressed. Therefore, a variation of the separation distance between the substrate 11 and the substrate 12 due to insufficient spreading of the sealing material SLp can be suppressed. As a result, the thickness of the liquid crystal layer LCL illustrated in FIG. 4 can be controlled with high accuracy.

In the sealing material hardening process illustrated in FIG. 7, energy is added to the sealing material SLp illustrated in FIG. 4, to harden the sealing material SLp. If the sealing material SLp is hardened, the substrate 11 and the substrate 12 are adhesively fixed to each other via the sealing material SLp. Energy for hardening the sealing material SLp includes heat energy or light energy such as ultraviolet energy.

A method for collectively forming a plurality of products in a large-sized base material and finally individualizing the products is preferable from the viewpoint of improving manufacturing efficiency of the liquid crystal display device LCD1. In this case, in the scribing/breaking process illustrated in FIG. 7, a cutting area of the substrate 11 or the substrate 12 is cut, to individualize the cutting area into a plurality of products. Thus, a contour shape of the liquid crystal display device LCD1 illustrated in FIG. 1 is obtained. At this time, an end surface of the substrate 11 positioned outside the substrate 12 (i.e., a side surface arranged at its peripheral edge) in a plan view is preferably subjected to polishing processing.

In a polarizing plate adhesion process illustrated in FIG. 7, the polarizing plate PL1 and the polarizing plate PL2 illustrated in FIG. 2 are respectively affixed to the front surface 11f of the substrate 11 and the back surface 12b of the substrate 12 via adhesive layers, and they are respectively adhesively fixed to the substrate 11 and the substrate 12.

In the foregoing processes, the liquid crystal display device LCD1 illustrated in FIGS. 3 and 4 is obtained. Then, the obtained liquid crystal display device LCD1 is incorporated into a housing (not illustrated), to complete the display device with the housing. The light source LS illustrated in FIG. 2 can previously be incorporated into the housing.

MODIFICATION EXAMPLES

Of the modification examples according to the present embodiment described above, representative modification examples will be described below.

Modification Example 1

Figure 10:
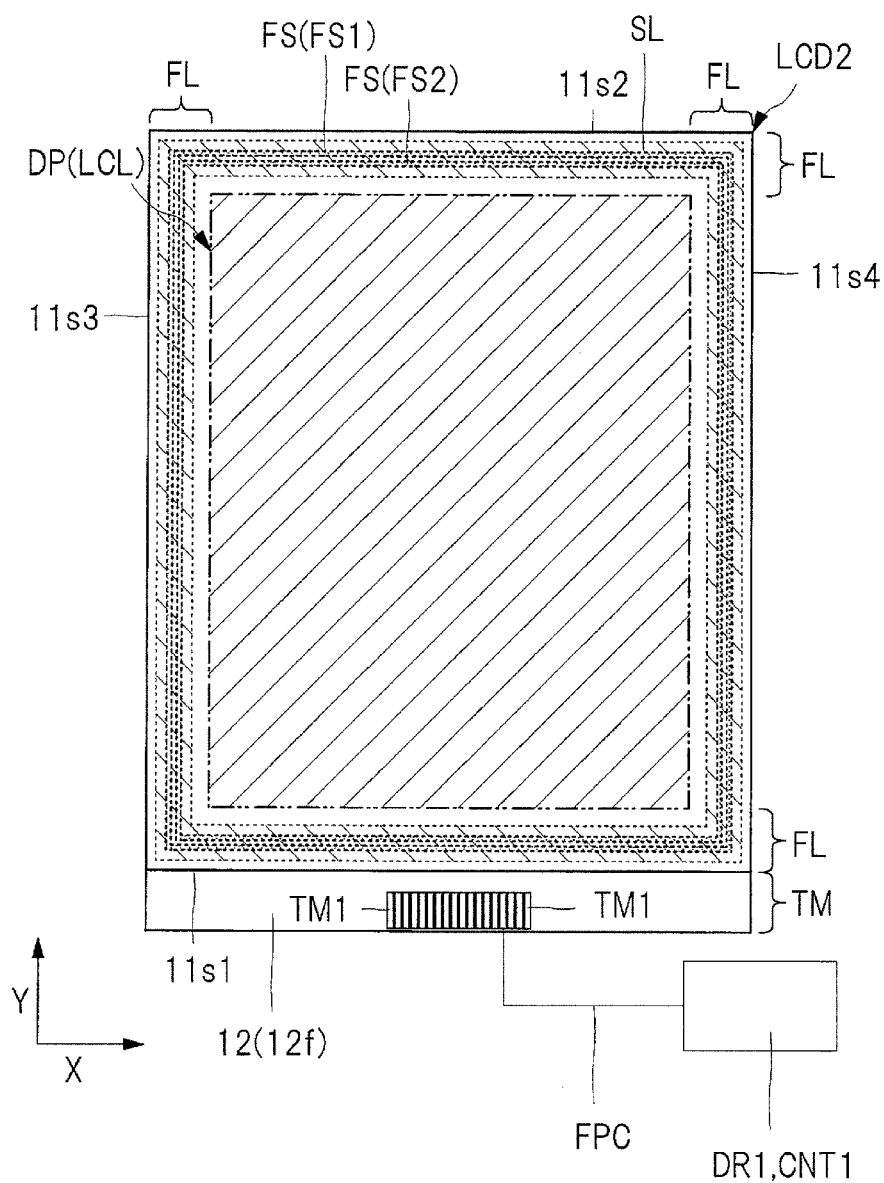
FIG. 10 is a plan view illustrating a modification example of FIG. 1.
Figure 11:
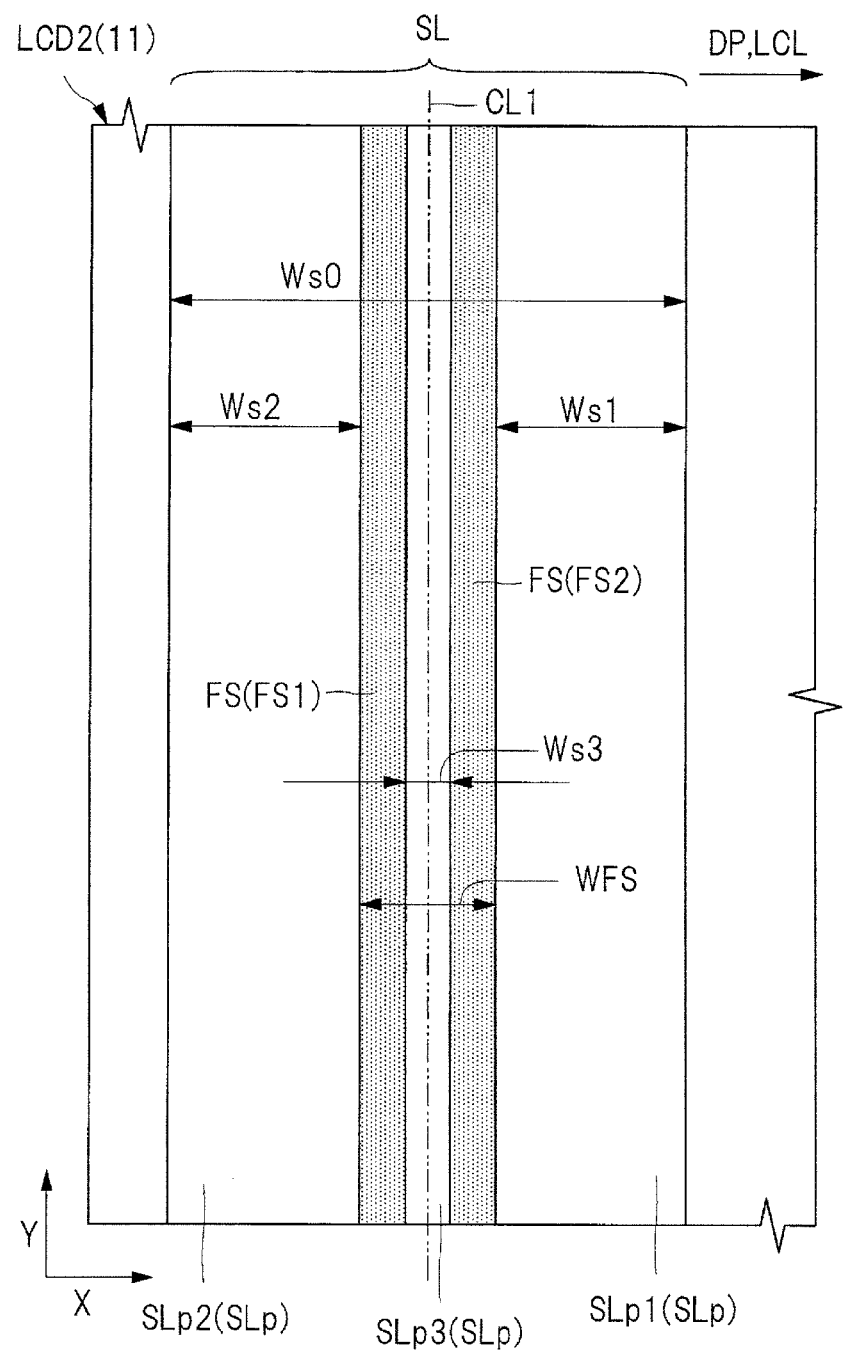
FIG. 11 is an enlarged plan view illustrating a modification example of FIG. 5.
Figure 12:
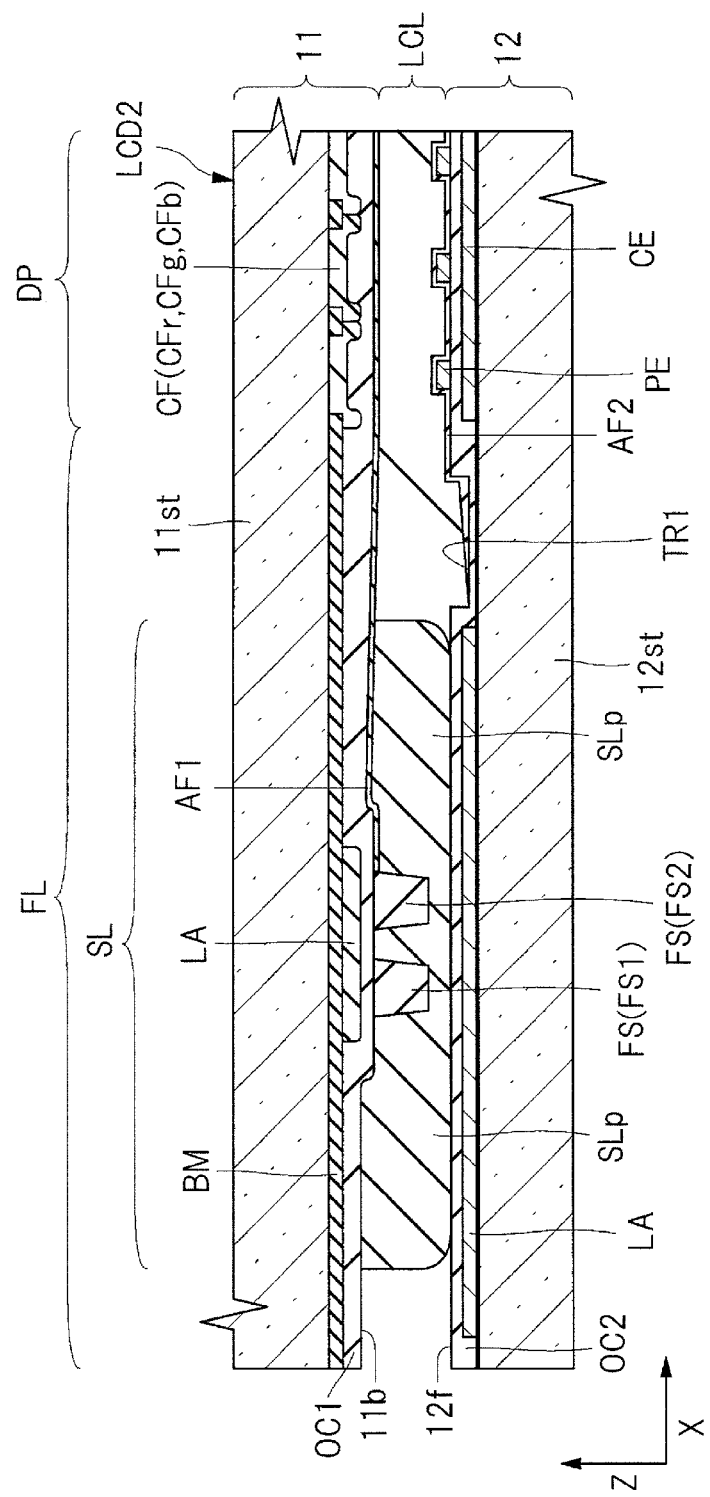
FIG. 12 is an enlarged sectional view illustrating a modification example of FIG. 4.
Figure 13:
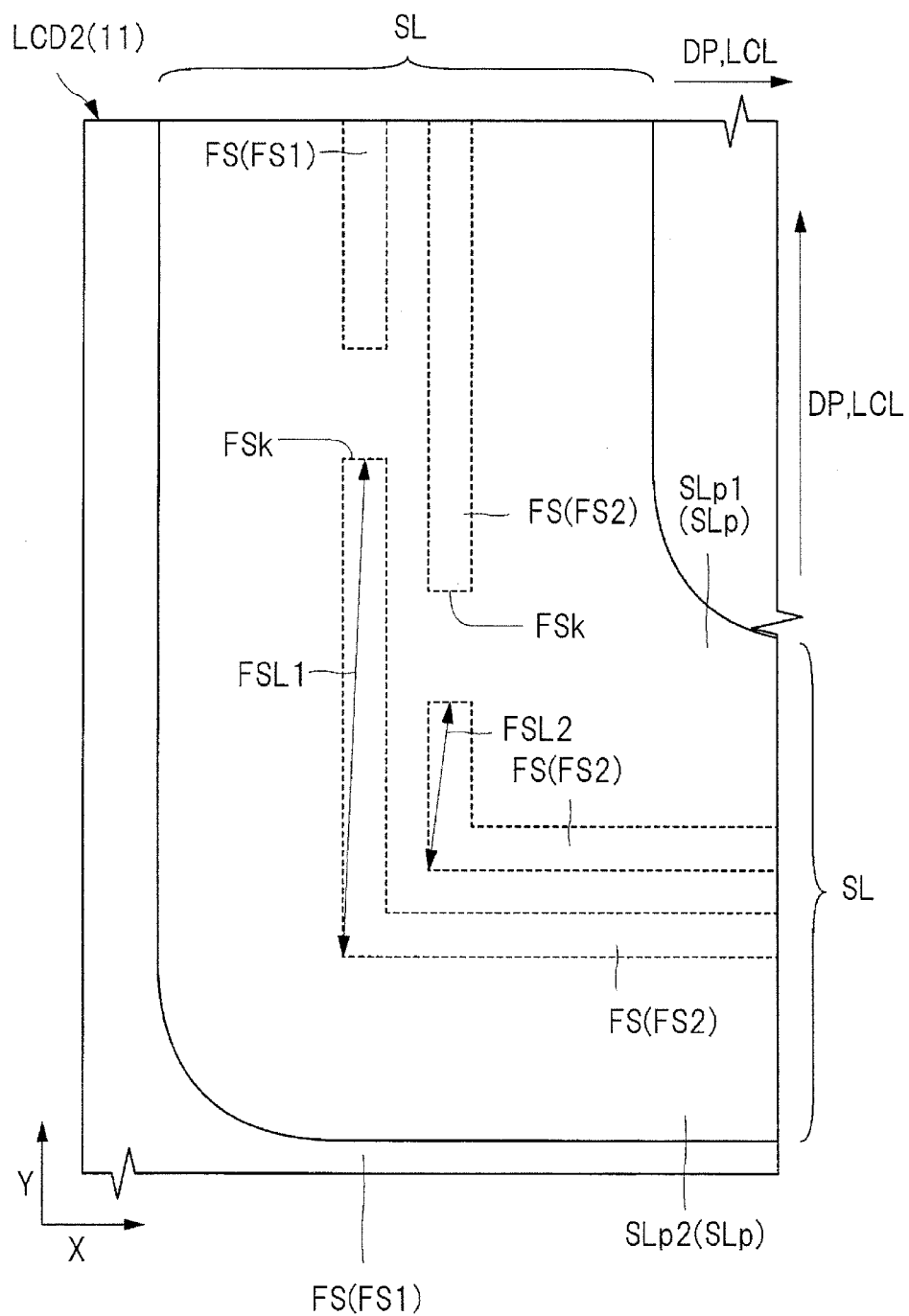
FIG. 13 is an enlarged plan view around a corner of a sealing section illustrated in FIG. 10.
Figure 14:
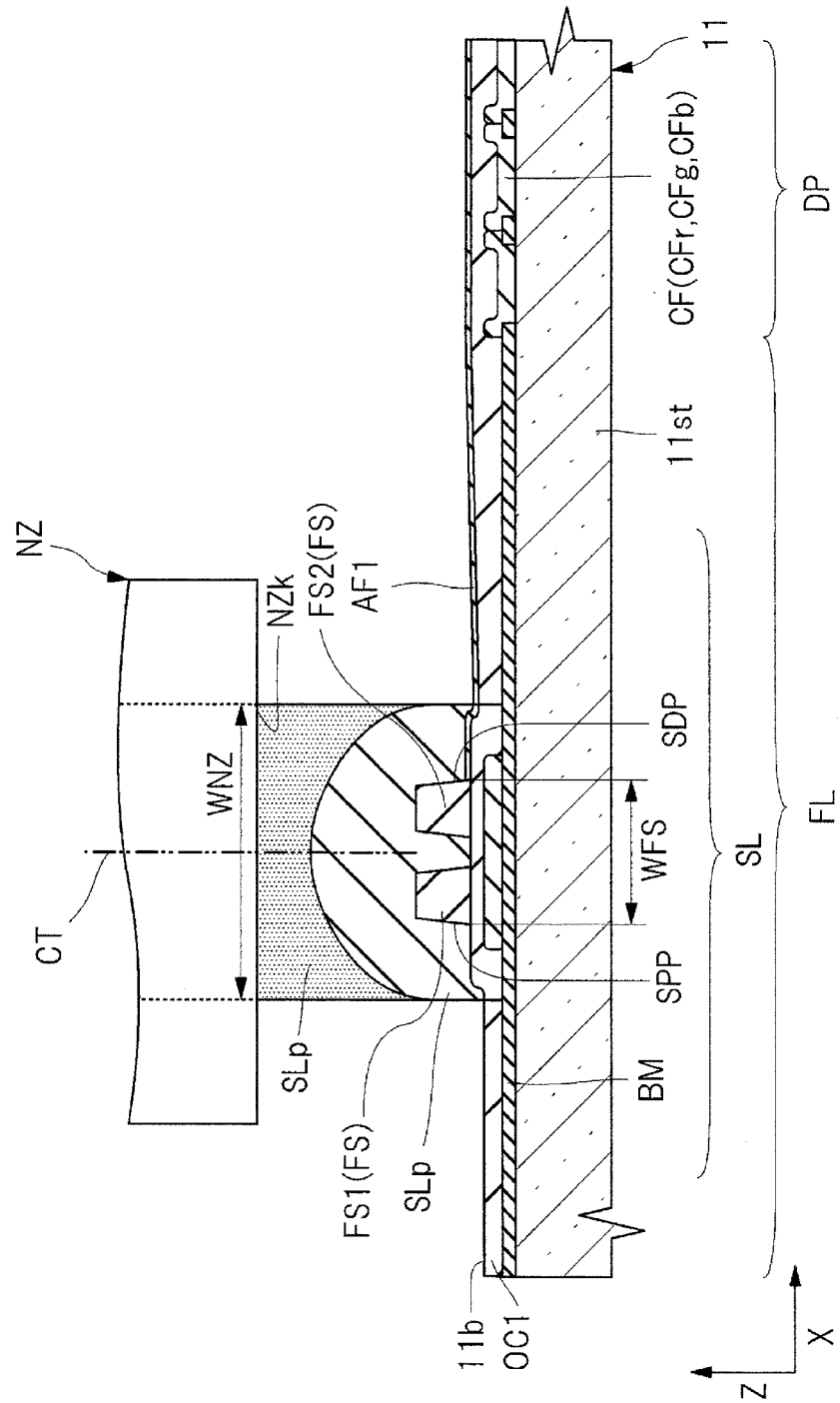
FIG. 14 is an enlarged sectional view illustrating a modification example of FIG. 8.

A modification example in which a plurality of members for damping spreading of an oriented film AF1 are arranged in a sealing section SL will be first described. FIG. 10 is a plan view illustrating a modification example of FIG. 1. FIG. 11 is an enlarged plan view illustrating a modification example of FIG. 5. FIG. 12 is an enlarged sectional view illustrating a modification example of FIG. 4. FIG. 13 is an enlarged plan view of the vicinity of a corner of a sealing section illustrated in FIG. 10. FIG. 14 is an enlarged sectional view illustrating a modification example of FIG. 8.

In FIG. 11, to explicitly indicate a positional relationship in a plan view between a center line CL1 in a width direction of a sealing section SL and a member FS1 and a member FS2, the center line CL1 serving as a virtual line is indicated by a two-dot and dash line. The member FS illustrated in FIG. 11 is a member arranged between a substrate 11 and a substrate 12 illustrated in FIG. 12. To explicitly indicate a planar position of the member FS, the member FS is indicated by a solid line and is given a dot pattern in FIG. 11.

A liquid crystal display device LCD illustrated in FIG. 10 differs from the liquid crystal display device LCD1 illustrated in FIG. 1 in that two members FS for damping spreading of an oriented film AF1 are formed in the sealing section SL. The liquid crystal display device LCD2 includes a member FS1 extending along an outer edge of a liquid crystal layer and a member FS2 arranged between the member FS1 and the liquid crystal layer LCL in a plan view. A sealing material SLp in the liquid crystal display device LCD2 is arranged on both adjacent sides of the member FS1 and on both adjacent sides of the member FS2.

The member FS1 and the member FS2 are respectively members formed for the purpose of damping the oriented film AF1, like the above-mentioned member FS. In an example illustrated in FIG. 12, the height of the member FS1 and the height of the member FS2 are equal.

When the members FS for damping the oriented film AF1 are thus doubly provided, the oriented film AF1 can be more reliably prevented from spreading. In an example illustrated in FIGS. 10 to 12, for example, even if a part of the oriented film AF1 gets over the member FS2, the member FS1 damps the oriented film AF1. Thus, the sealing material SLp and the substrate 11 can reliably be made to adhere to each other in a region outside the member FS1.

As illustrated in FIG. 10, the substrate 12 in the liquid crystal display device LCD2 includes a plurality of terminals TM1 formed in a terminal section TM provided outside a frame section FL. Each of the plurality of terminals TM1 is electrically connected to various circuits such as a driving circuit formed in a display section DP. Therefore, a pullout wiring electrically connected to the display section DP and the terminal section TM is formed in the substrate 12.

If each of the members FS1 and FS2 does not contact the substrate 12, as illustrated in FIG. 12, a member such as the pullout wiring can be made difficult to be damaged even if the member is formed in the sealing section SL in the substrate 12. However, from the viewpoint of more reliably preventing the member such as the pullout wiring from being damaged, clearances FSk are preferably formed, respectively, in the member FS1 and the member FS2, as illustrated in FIG. 13, and pullout wirings are preferably formed, respectively, at positions overlapping the clearances FSk.

As this time, if the number of members FS formed in the sealing section SL is one, like in the liquid crystal display device LCD1 illustrated in FIG. 1, when a clearance FSk (see FIG. 13) is formed in the member FS, an oriented film AF1 (see FIG. 4) may leak from the clearance FSk. Therefore, if the clearance FSk is formed in the member FS, the clearance FSk is preferably formed at a corner of the member FS formed in a frame shape. A distance from the corner of the member FS to the display section DP is large, even if the oriented film AF1 leaks from the clearance FSk, so that an effect on the display section DP can be reduced.

On the other hand, if the members FS are doubly provided, as illustrated in FIG. 13, leakage of an oriented film AF1 (see FIG. 12) can be suppressed even when the clearance FSk is formed in a part of each of the members FS. If the clearances FSk are respectively formed in the member FS1 and the member FS2, as illustrated in FIG. 13, the clearance FSk is preferably formed in the vicinity of a corner of each of the members FS1 and FS2 formed in a frame shape.

More specifically, as illustrated in FIG. 13, a length FSL2 from the clearance FSk formed in the member FS2 arranged on the side of the display section DP to a corner of the member FS2 is relatively smaller than a length FSL1 from the clearance FSk formed in the member FS1 to a corner of the member FS1. If the oriented film AF1 is considered to spread radially from the center of the display section DP illustrated in FIG. 10, the oriented film AF1 (see FIG. 12) can be prevented from leaking if the clearances FSk are arranged, as illustrated in FIG. 13.

If the members FS are doubly provided, as described above, leakage of the oriented film AF1 can be suppressed. However, in the liquid crystal display device LCD2, a plurality of members, which can become a factor for inhibiting the sealing material SLp from spreading, are formed in the sealing section SL. Therefore, when the sealing material SLp is applied and then spreads in the sealing section SL, the sealing material SLp is more easily inhibited from spreading than in the liquid crystal display device LCD1 illustrated in FIG. 1, described above.

In a sealing material application process in this modification example, the sealing material SLp is applied to stride over each of the member FS1 and the member FS2 in the width direction of the members FS1 and FS2, as illustrated in FIG. 14. In an example illustrated in FIG. 14, in the sealing material application process in this modification example, the sealing material SLp adheres to side surfaces, on the side of the display section DP and on the opposite side thereof, of the member FS2 and side surfaces, on the side of the display section DP and the opposite side thereof, of the member FS1. Thus, in a substrate overlap process, an amount of the sealing material SLp, which moves beyond the member FS1 or the member FS2, can be reduced.

For applying the sealing material SLp to stride over each of the member FS1 and the member FS2 in the width direction of the members FS1 and FS2 in this way, an application width of the sealing material SLp by a nozzle NZ is preferably made larger than the total width of the member FS1 and the member FS2 (a width when the member FS1 and the member FS2 are taken as an integrated body). That is, an opening width WNZ of an opening NZk of the nozzle NZ is larger than a distance WFS from a side surface SDP, on the side of the display section DP, of the member FS2 to a side surface SPP, on the opposite side of the display section DP, of the member FS1.

In a substrate overlap process, the member FS1 and the member FS2 are preferably formed on the opposite sides to each other with a center line CL1 in the width direction of the sealing section SL sandwiched therebetween, as illustrated in FIG. 11, from the viewpoint of further reducing an amount of the sealing material SLp that moves beyond the member FS1 or the member FS2.

In the substrate overlap process, the sealing material SLp is preferably discharged while the center CT of the opening NZk of the nozzle NZ is positioned above a region between the member FS1 and the member FS2, as illustrated in FIG. 14, in the sealing material application process, from the viewpoint of further reducing the amount of the sealing material SLp that moves beyond the member FS1 or the member FS2.

In the sealing section SL formed by pushing out the sealing material SLp toward the both adjacent sides of the member FS from the top of the member FS, the member FS exists substantially at the center in the width direction of the sealing section SL, illustrated as an X-direction in FIG. 11. More specifically, the sealing material SLp has a portion SLp1 arranged on the side of the liquid crystal layer LCL of the member FS2, a portion SLp2 arranged on the opposite side of the liquid crystal layer LCL of the member FS1, and a portion SLp3 arranged between the member FS1 and the member FS2. In an example illustrated in FIG. 11, a width Ws1 of the portion SLp1 and a width Ws2 of the portion SLp2 are substantially equal. In other words, a ratio of the width Ws1 of the portion SLP1 to the width Ws2 of the portion SLp2 is five to five.

On the other hand, a width Ws3 of the portion SLp3 is preferably a value that is as small as possible in a range in which no air bubbles remain between the member FS1 and the member FS2. In the example illustrated in FIG. 11, for example, the width WS3 of the portion SLp3 is smaller than the width Ws1 and the width Ws2. When the width Ws3 is thus made small, an amount of the sealing material SLp, which moves beyond the member FS1 or the member FS2, can be reduced in the substrate overlap process. When the width Ws3 is thus made small, a planar area of the portion SLp2, which greatly affects sealing strength of the sealing section SL, can be increased.

A relationship between the width Ws1 of the portion SLp1 and the width Ws2 of the portion SLp2 is similar to the relationship described with reference to FIG. 5.

For example, an adhesion area between the sealing material SLp and the substrate 11 can preferably be increased from the viewpoint of improving sealing strength between the substrate 11 and the substrate 12 illustrated in FIG. 12. That is, a value of the width Ws2 illustrated in FIG. 11 has a preferable range from the viewpoint of ensuring required sealing strength. For example, in this modification example, the width Ws0 is preferably approximately 0.8 mm, while the width Ws2 is preferably approximately 0.3 mm or more. When a material for improving an adhesion property between the sealing material SLp and a resin layer OC1 illustrated in FIG. 12 is selected, required sealing strength may be able to be ensured even if the width Ws2 is approximately 0.15 mm. In this case, the width Ws0 of the entire sealing section SL can be reduced. That is, the width of the frame section FL illustrated in FIG. 12 can be reduced.

As described above, a specific numerical value of the width Ws2 changes depending on the size of the liquid crystal display device and a material constituting the sealing section SL. However, a ratio of a preferable width Ws2 to the entire width Ws0 of the sealing section SL can be defined, considering that the width of a frame section FL is reduced. That is, the width Ws2 of the portion SLp2 is preferably 25% or more and particularly preferably 40% or more of the width Ws0 of the entire sealing section SL.

The width Ws1 of the portion SLp1 illustrated in FIG. 11 is preferably 25% or more and particularly preferably 40% or more of the entire width Ws0 of the sealing section SL from the viewpoint of inhibiting the sealing material SLp from spreading and suppressing an increase in the thickness of the sealing material SLp on the member FS.

As illustrated in FIG. 12, in the present embodiment, the member FS1 and the member FS2 do not contact a front surface 12f of the substrate 12. Thus, a sealing material SLp exists between the member FS1 and the substrate 12 and between the member FS2 and the substrate 12. In this case, when the sealing material SLp is pushed out, a required pressing force for making the sealing material SLp get over the member FS1 and the member FS2 can be reduced. Therefore, a structure in which the member FS1 and the member FS2 do not contact the front surface 12f of the substrate 12, as illustrated in FIG. 12, is preferable from the viewpoint of easily controlling the thickness of the sealing material SLp.

Modification Example 2

Figure 15:
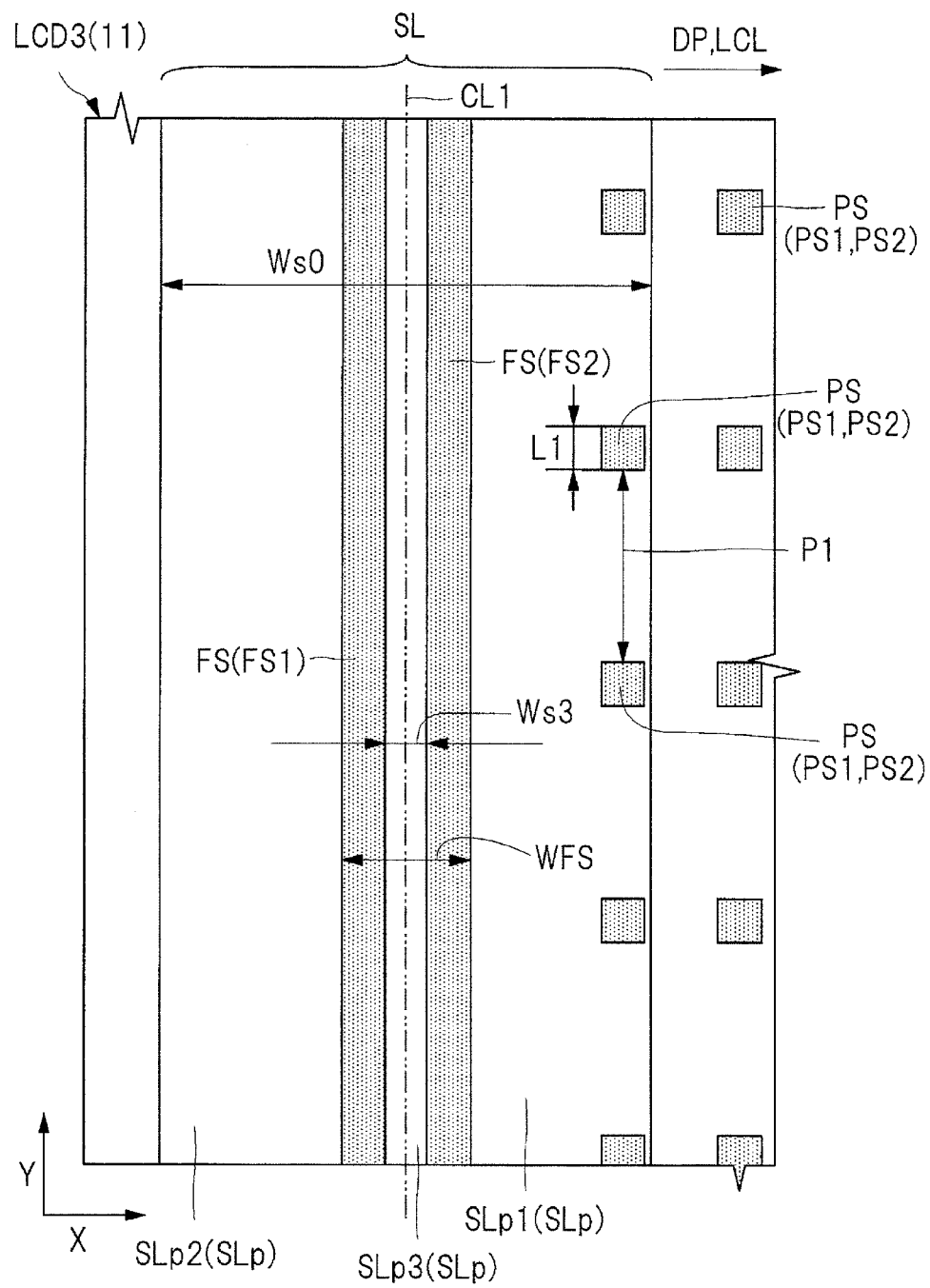
FIG. 15 is an enlarged plan view illustrating a modification example of FIG. 11.

A modification example in which a projection member other than a member FS is formed in a sealing section SL will be described below. FIG. 15 is an enlarged plan view illustrating a modification example of FIG. 11. In FIG. 15, a member FS and a spacer member PS are indicated by a solid line and are given a dot pattern to explicitly indicate planar shapes and layouts of the member FS and the spacer member PS.

In the above-mentioned embodiments and modification example 1, examples in which any projection member projecting from the back surface 11b of the substrate 11 (see FIGS. 4 and 12), other than the member FS formed for the purpose of damping the oriented film, is not formed in a sealing section SL, as illustrated in FIGS. 5 and 11, for example, have been described. However, if the independent members are arranged apart from one another, like the plurality of spacer members PS illustrated in FIG. 6, the spacer members do not easily become a factor for inhibiting a fluid from moving.

Therefore, some of a plurality of spacer members PS serving as members projecting from a back surface 11b of a substrate 11 (see FIG. 12) may be formed in the sealing section SL, like in a liquid crystal display device LCD3 illustrated in FIG. 15.

For the spacer members PS not to inhibit the sealing material SLp from spreading, however, a separation distance P1 between the adjacent spacer members PS among the plurality of spacer members PS arranged in the sealing section SL is preferably larger than a length L1 of the spacer member PS in a direction in which the sealing section SL extends. For example, the separation distance P1 is preferably larger than 100 μm. A length L1 of each of the spacer members PS is substantially equal to the width of the member FS, and is preferably 30 μm to 60 μm, for example.

Thus, the sealing material SLp stably easily spreads because it wraps around the spacer member PS via a space between the adjacent spacer members PS.

While the liquid crystal display device LCD3 illustrated in FIG. 15 has been illustrated as a modification example of the liquid crystal display device LCD2 illustrated in FIG. 11, it may be applied as a modification example of the liquid crystal display device LCD1 in which the one member FS is formed in the sealing section SL, as illustrated in FIG. 5.

Figure 16:
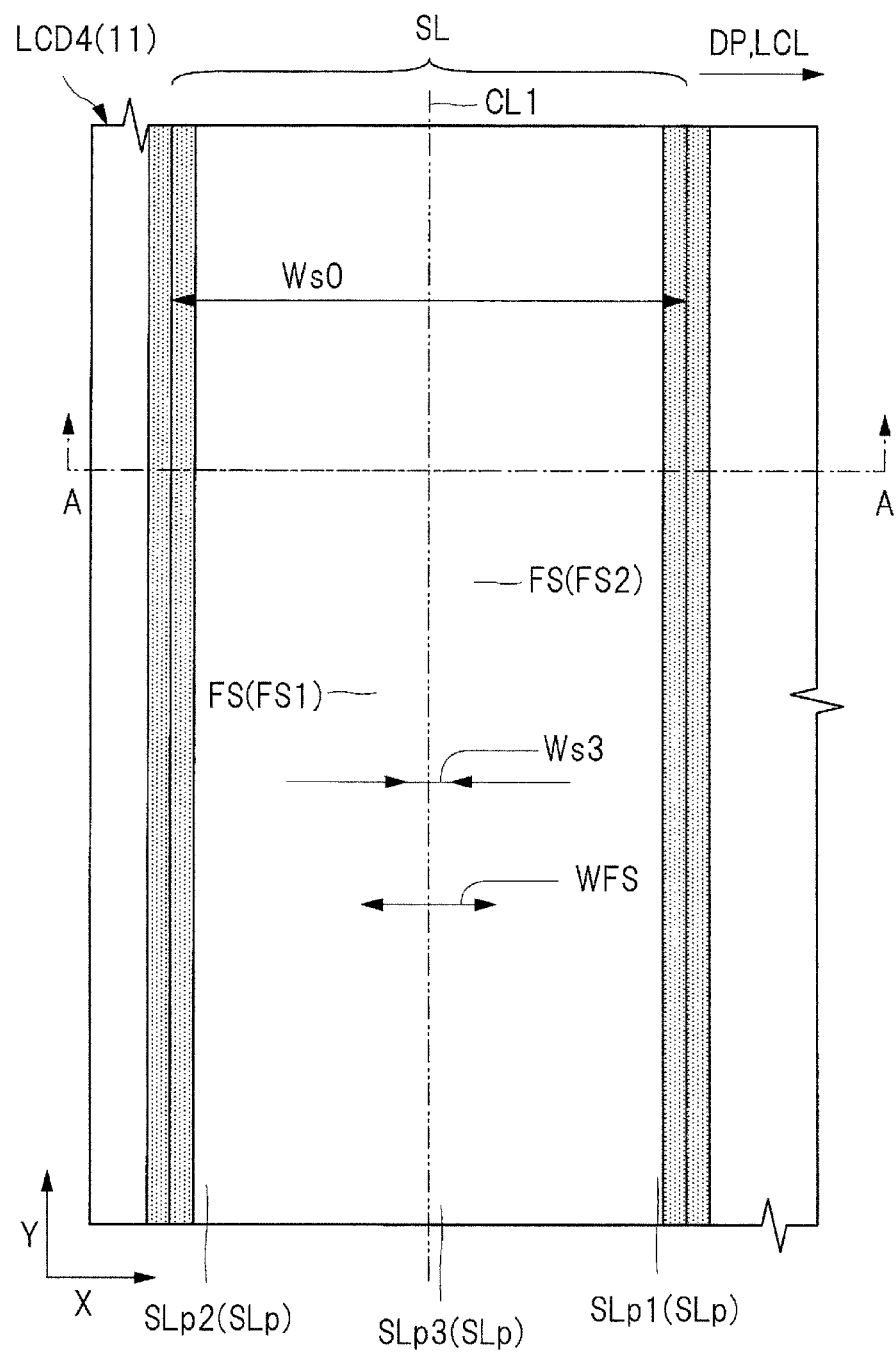
FIG. 16 is another enlarged plan view illustrating a modification example of FIG. 11.
Figure 17:
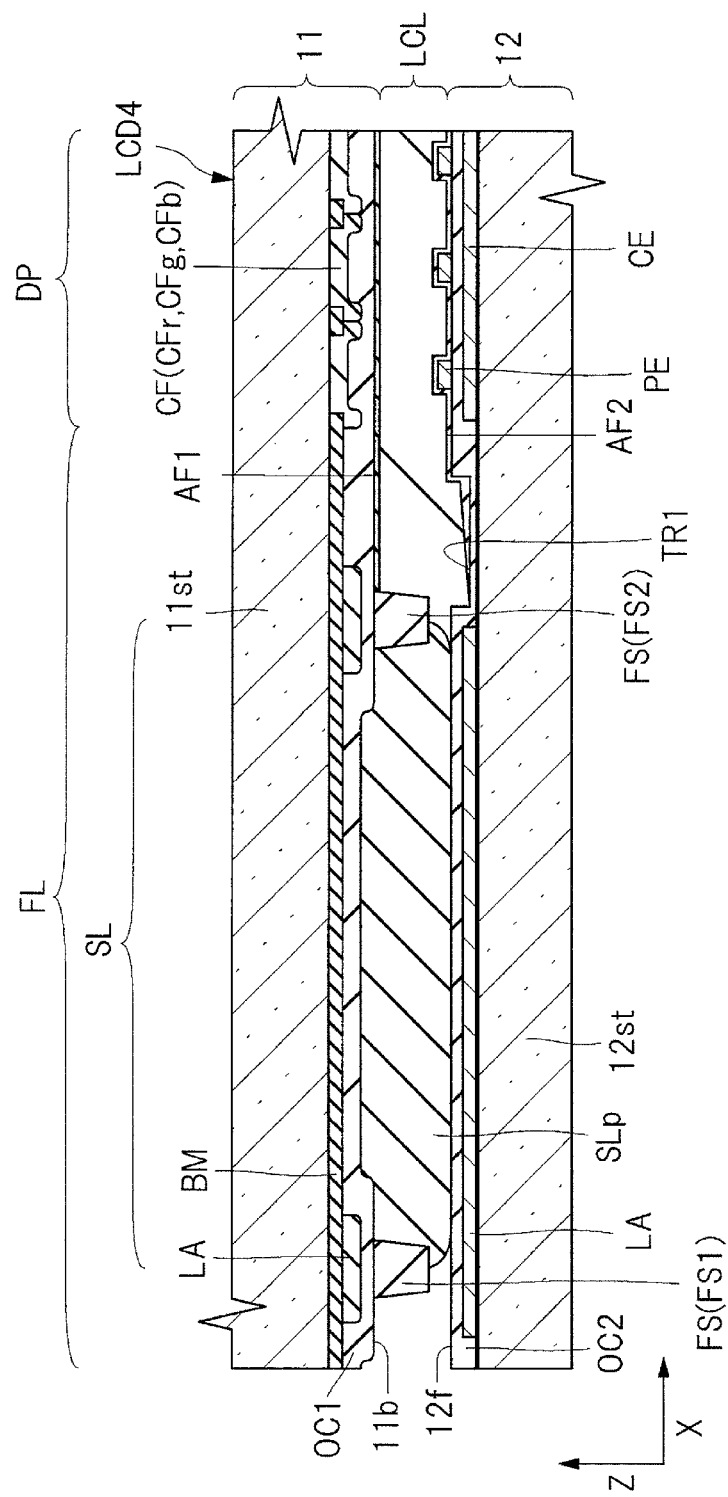
FIG. 17 is an enlarged sectional view taken along a line A-A illustrated in FIG. 16.

A configuration such as a liquid crystal display device LCD4 illustrated in FIG. 16 is also considered from the viewpoint of reducing an amount of a sealing material SLp that gets over a member FS. FIG. 16 is an enlarged plan view illustrating another modification example of FIG. 11. FIG. 17 is an enlarged sectional view taken along a line A-A illustrated in FIG. 16.

The liquid crystal display device LCD4 illustrated in FIGS. 16 and 17 differs from the above-mentioned liquid crystal display devices LCD1, LCD2, and LCD3 in that it is premised that the sealing material SLp does not get over the member FS.

More specifically, in the liquid crystal display device LCD4, a member FS1 and a member FS2 extending along an outer edge of a liquid crystal layer LCL are arranged at both ends in a width direction of a sealing section SL. Any member, projecting from a back surface 11b of a substrate 11 (see FIG. 17) is not formed between the member FS1 and the member FS2.

In the liquid crystal display device LCD4, the member FS controls a range in which the sealing material SLp spreads using a property for inhibiting the sealing material SLp from spreading. Thus, in a sealing material application process, a method for manufacturing the liquid crystal display device LCD4 differs from the methods for manufacturing the liquid crystal display devices LCD1, LCD2, and LCD3 in that the sealing material SLp is applied between the member FS1 and the member FS2 and does not stride over the member FS1 and the member FS2.

In this modification example, if the accuracy of an application amount of the sealing material SLp is high, it is preferable in that a formation range of the sealing section SL can be controlled.

On the other hand, in the above-mentioned liquid crystal display devices LCD1, LCD2, and LCD3, even if an application amount of the sealing material SLp slightly varies, it is preferable in that the sealing material SLp can stably spread. In the liquid crystal display devices LCD2 and LCD3, the oriented film AF1 does not spread outwardly beyond the member FS1 arranged on the side of the peripheral edge. Thus, it is preferable in that sealing strength can be reliably improved.

In the foregoing, the invention made by the inventors of the present invention has been concretely described based on the embodiments. However, it is needless to say that the present invention is not limited to the foregoing embodiments and various modifications and alterations can be made within the scope of the present invention.

In the category of the idea of the present invention, a person with ordinary skill in the art can conceive various modification examples and revised examples, and such modification examples and revised examples are also deemed to belong to the scope of the present invention. For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention is applicable to a display device such as a liquid crystal display device and an electronic apparatus incorporating the display device.

What is claimed is:

1. A liquid crystal display device comprising a first substrate having a first surface, a second substrate having a second surface opposing the first surface of the first substrate, a liquid crystal layer arranged between the first substrate and the second substrate, and a sealing section arranged around the liquid crystal layer and provided between the first substrate and the second substrate, wherein the sealing section includes:
a first member arranged extending along an outer edge of the liquid crystal layer in a plan view, the first member being arranged on the first substrate, the first member having at least a first gap region;
a second member arranged extending along an outer edge of the liquid crystal layer in a plan view, the second member being formed between the first member and the liquid crystal layer in a plan view, the second member being arranged on the first substrate, the second member having at least a second gap region; and
a sealing material arranged on both adjacent sides of the first and second member and continuously surrounding a periphery of the liquid crystal layer in a plan view, the sealing material having a first portion arranged on a side of the liquid crystal layer of the second member and a second portion arranged on an opposite side of the liquid crystal layer of the first member, a third portion arranged between the first member and the second member, the width of the first portion and the second portion is wider than the width of the third portion, the first substrate has a first oriented film formed on the first surface serving as an interface contacting the liquid crystal layer, and a peripheral edge of the first oriented film overlaps with the first portion of the sealing material in a plan view, and is arranged between the second member and the outer edge of the liquid crystal layer in a plan view.

2. The liquid crystal display device according to claim 1, wherein a width of the second portion is 25% or more of a width of the entire sealing section.

3. The liquid crystal display device according to claim 2, wherein a width of the first portion is 25% or more of a width of the entire sealing section.

4. The liquid crystal display device according to claim 1, wherein the sealing material exists between the first member and the second substrate.

5. The liquid crystal display device according to claim 1, wherein the gap region of the first member and the gap region of the second member are formed in different positions in a plan view.

6. The liquid crystal display device according to claim 5, wherein the gap region of the first member and the gap region of the second member are formed at positions not overlapping with each other in a plan view.

7. The liquid crystal display device according to claim 1, wherein a height adjustment layer is formed between the first substrate and the first/second member.

8. The liquid crystal display device according to claim 7, wherein the first substrate has a plurality of color filter layer, and the height adjustment layer is formed of the color filter layer.

9. The liquid crystal display device according to claim 1, wherein the second substrate has a groove portion at a position not overlapping with the sealing section and along an extending direction of the sealing section, the second substrate has a second oriented film formed on the second surface serving as an interface contacting the liquid crystal layer, and the peripheral edge of the second alignment film is disposed in the groove portion in a plan view.

* * * * *